United States Patent
Little et al.

(10) Patent No.: US 8,601,279 B2
(45) Date of Patent: *Dec. 3, 2013

(54) DEBUGGING PORT SECURITY INTERFACE

(75) Inventors: Herbert A. Little, Waterloo (CA);
Jerrold R. Randell, Waterloo (CA);
Richard C. Madter, Puslinch (CA);
Ryan J. Hickey, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/542,815

(22) Filed: Jul. 6, 2012

(65) Prior Publication Data

US 2012/0278630 A1    Nov. 1, 2012

Related U.S. Application Data

(63) Continuation of application No. 12/325,853, filed on Dec. 1, 2008, now Pat. No. 8,219,825, which is a continuation of application No. 11/049,987, filed on Feb. 4, 2005, now Pat. No. 7,461,407.

(60) Provisional application No. 60/542,173, filed on Feb. 5, 2004.

(51) Int. Cl.
*G06F 21/00* (2013.01)

(52) U.S. Cl.
USPC ........ 713/183; 370/229; 370/230; 370/395.2; 714/38.1; 714/E11.207

(58) Field of Classification Search
USPC ....................... 713/183; 370/229, 230, 395.2; 714/38.1, E11.207
See application file for complete search history.

(56) References Cited

U.S. PATENT DOCUMENTS

| | | | |
|---|---|---|---|
| 6,044,470 A | 3/2000 | Kuriyama | |
| 6,622,184 B1 | 9/2003 | Tabe et al. | |
| 6,941,454 B1 | 9/2005 | Spraggs | |
| 7,093,237 B2 | 8/2006 | Moser et al. | |
| 7,185,161 B2 * | 2/2007 | Kang | 711/164 |
| 7,284,132 B2 | 10/2007 | Nakabe et al. | |

(Continued)

FOREIGN PATENT DOCUMENTS

| | | |
|---|---|---|
| CA | 2536610 | 4/2013 |
| WO | 01/57627 A2 | 8/2001 |
| WO | 03/081400 A2 | 10/2003 |
| WO | 2005/076139 A1 | 8/2005 |

OTHER PUBLICATIONS

Related U.S. Appl. No. 11/049,987, now issued to United States Patent as U.S. Patent No. 7,461,407, filed Feb. 4, 2005.

(Continued)

*Primary Examiner* — Thanhnga B Truong
(74) *Attorney, Agent, or Firm* — Bereskin and Parr LLP/S.E.N.C.R.L., s.r.l.

(57) ABSTRACT

The present invention provides a secure JTAG interface to an application-specific integrated circuit (ASIC). In the preferred embodiment the invention operates through the combined efforts of a Security Module (SM) comprising a state machine that controls the security modes for the ASIC, and a Test Control Module (TCM) which contains the JTAG interface. The TCM operates in either a restricted mode or an unrestricted mode, depending on the state of the SM state machine. In a restricted mode, only limited access to memory content is permitted. In an unrestricted mode, full access to memory content is permitted.

21 Claims, 26 Drawing Sheets

(56) References Cited

U.S. PATENT DOCUMENTS

| | | | |
|---|---|---|---|
| 7,461,407 | B2 | 12/2008 | Little et al. |
| 8,219,825 | B2 | 7/2012 | Little et al. |
| 8,259,568 | B2 * | 9/2012 | Laudermilch et al. ........ 370/230 |
| 2003/0005335 | A1 | 1/2003 | Watanabe |
| 2003/0014653 | A1 | 1/2003 | Moller et al. |
| 2003/0177373 | A1 | 9/2003 | Moyer et al. |
| 2003/0212897 | A1 | 11/2003 | Dickerson et al. |
| 2003/0226025 | A1 | 12/2003 | Lin et al. |
| 2005/0091520 | A1 | 4/2005 | Khan et al. |
| 2007/0113218 | A1 * | 5/2007 | Nolan et al. .................. 717/124 |
| 2009/0132827 | A1 | 5/2009 | Little et al. |

OTHER PUBLICATIONS

United States Notice of Allowance for U.S. Appl. No. 11/049,987, dated Jul. 30, 2008.
United States Response for U.S. Appl. No. 11/049,987, dated Apr. 22, 2008.
United States Office Action for U.S. Appl. No. 11/049,987, dated Jan. 22, 2008.
Related U.S. Appl. No. 12/325,853, filed Dec. 1, 2008.
United States Notice of Allowance and Interview Summary for U.S. Appl. No. 12/325,853, dated Mar. 8, 2012.
United States Response for U.S. Appl. No. 12/325,853, dated Jan. 11, 2012.
United States Office Action for U.S. Appl. No. 12/325,853, dated Oct. 13, 2011.
United States Response for U.S. Appl. No. 12/325,853, dated Aug. 5, 2011.
United States Office Action for U.S. Appl. No. 12/325,853, dated May 5, 2011.
International Search Report and Written Opinion for PCT/CA2005/000136, dated May 26, 2005.
International Preliminary Report on Patentability and Written Opinion for PCT/CA2005/000136, dated Aug. 7, 2006.
Canadian Office Action for Canadian Patent Application No. 2,536,610, dated Apr. 17, 2009.
Canadian Office Action for Canadian Patent Application No. 2,536,610, dated Sep. 9, 2010.
Canadian Office Action for Canadian Patent Application No. 2,536,610, dated Sep. 15, 2011.
European Decision to Refuse a European Patent Application for European Patent Application No. 05714419.8, dated Jan. 19, 2011.
European minutes in accordance with Rule 124(4) EPC for European Patent Application No. 05714419.8, dated Jan. 17, 2011.
European Response to Summons to Oral Proceedings for European Patent Application No. 05714419.8, dated Nov. 16, 2010.
European Summons to Oral Proceedings pursuant to Rule 115(1) EPC for European Patent Application No. 05714419.8, dated Sep. 30, 2010.
European Response to third Examination Report for European Patent Application No. 05714419.8, dated Sep. 21, 2009.
Third European Examination Report for European Patent Application No. 05714419.8, dated Jul. 16, 2009.
European Response to second Examination Report for European Patent Application No. 05714419.8, dated Aug. 15, 2008.
Second European Examination Report for European Patent Application No. 05714419.8, dated Feb. 14, 2008.
European Response to first Examination Report for European Patent Application No. 05714419.8, dated Dec. 13, 2007.
First European Examination Report for European Patent Application No. 05714419.8, dated Jul. 11, 2007.
European Supplementary Search Report for European Patent Application No. 05714419.8, dated Feb. 20, 2007.
Canadian Notice of Allowance for Canadian Patent Application No. 2,536,610, dated Oct. 29, 2012.

* cited by examiner

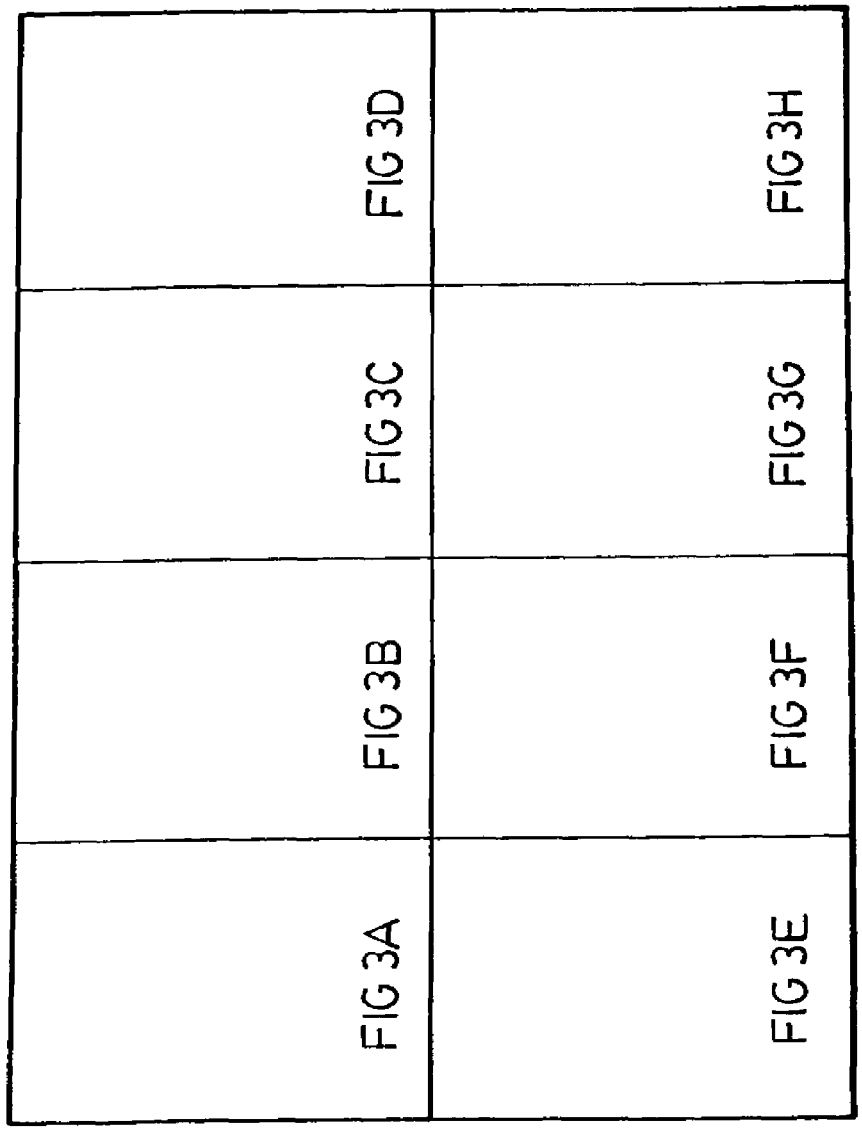

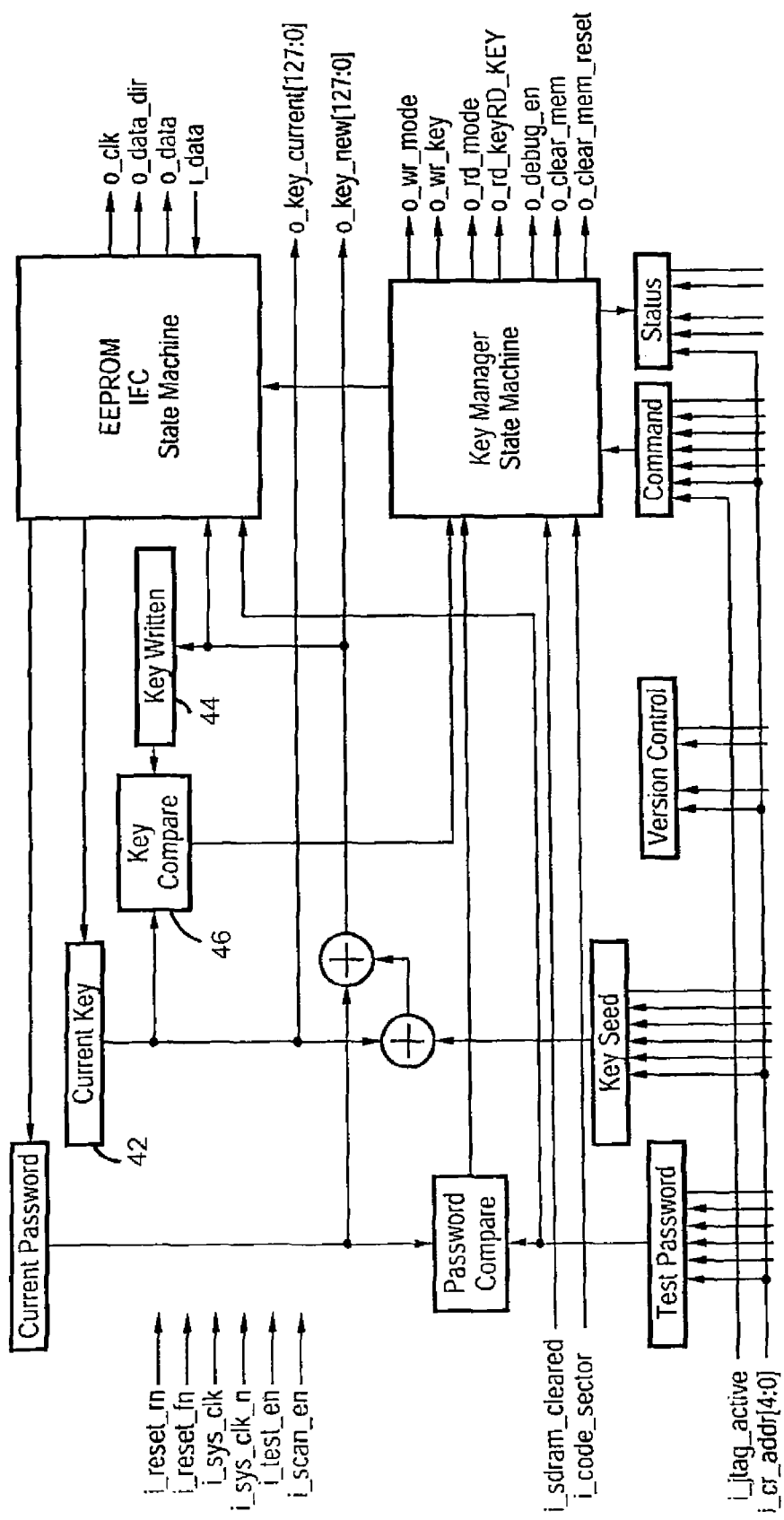

| Address Offset (1) MCU_ADDR[5:0] | NAME | Contents |
|---|---|---|
| 0x00 | SEC-CTRL | Control Register |
| 0x02 | SEC-STAT | Status Register |
| 0x10 | SEC-VER_CTRL | Version Control Register |
| 0x20 | SEC-PW | Password Register Field |
| 0x30 | SEC-KS | Key Seed Register Field |

NOTES:
(1) This Address Offset is added to the SEC base address (SEC_BASE) as define by the MIC in Table 5.2-29.

FIG. 6

| SEC Control Register | | Address: | see Figure 6 |
| --- | --- | --- | --- |
| | | Reset State: | 0x0000 |
| SEC-CTRL | | Access: | 16 bit |
| Read/Write | | | |

| 15 | 14 | 13 | 12 | 11 | 10 | 9 | 8 |
| --- | --- | --- | --- | --- | --- | --- | --- |
| N/A | | | | | | | |

| 7 | 6 | 5 | 4 | 3 | 2 | 1 | 0 |
| --- | --- | --- | --- | --- | --- | --- | --- |
| FAST_IF | CLEAR_SDRAM | DIS_ENCRYPT | KEY_SELECT[1:0] | | CMD[2:0] | | |

| Bit # | Bit Mnemonic | Function |
| --- | --- | --- |
| 15:8 | N/A | (RO) '0000 0000' |
| 7 | FAST_IF | Fast Interface (R/W)<br>0: Normal (EEPROM clock speed = sys_clk/1024)<br>1: Fast (EEPROM clock speed = sys_clk/8)<br>Fast mode is provided for debug/test purposes only. EEPROM operation is not characterized at this speed. |
| 6 | CLEAR_SDRAM | Clear SDRAM (R/W)<br>0: CLEAR_SDRAM signal to SIC is controlled by state machine.<br>1: CLEAR_SDRAM signal to SIC is asserted. |
| 5 | DIS_ENCRYPT | Disable Encryption (R/W*)<br>0: Encryption and decryption is performed as per the current state.<br>1: Encryption and decryption is bypassed.<br>This bit is only writeable when accessed from the processor interface. |
| 4:3 | KEY_SELECT[1:0] | Key Select (R/W)<br>00 : Password and Key set 0<br>01 : Password and Key set 1<br>10 : Password and Key set 2<br>11 : Password and Key set 3 |
| 2:0 | CMD[2:0] | Key Command (R/W)<br>000: GET_KEY<br>001: COMPARE<br>010: ADD_KEY<br>011: REMOVE_KEY<br>100: CHANGE_KEY<br>101: UPDATE_KEY<br>110: ENTER_DEBUG<br>111: EXIT_DEBUG |

FIG. 7A

| Bit # | Bit Mnemonic | Function |
|---|---|---|
| 3:0 | MODE[3:0] | Key Mode (RO)<br>0000 : Insecure<br>0001 : Clear_SDRAM<br>0010 : Insecure_Debug<br>0011 : Get_Key<br>0100 : Key_Loaded<br>0101 : Compare_Keys<br>0110 : Add_Key<br>0111 : Remove_Key<br>1000 : Change_Key<br>1001 : Update_Key<br>1010 : Secure<br>1011 : Compare_Keys2<br>1100 : Validate<br>1101 : Secure_Debug<br>1110 : not valid<br>1111 : not valid |

FIG. 7B

| SEC Status Register | | | | | | Address: see Figure 6 | | |
|---|---|---|---|---|---|---|---|---|
| | | | | | | Reset State: 0x0000 | | |
| SEC-STAT | | | | | | Access: 16 bit | | |
| Read/Write | | | | | | | | |

| 15 | 14 | 13 | 12 | 11 | 10 | 9 | 8 |
|---|---|---|---|---|---|---|---|
| CMD_BUSY | EEPROM_BUSY | EEPROM_ERROR | N/A | | | | SDRAM_CLEAR |

| 7 | 6 | 5 | 4 | 3 | 2 | 1 | 0 |
|---|---|---|---|---|---|---|---|
| KEY_STAT[1:0] | | PW_STAT[1:0] | | MODE[3:0] | | | |

| Bit # | Bit Mnemonic | Function |
|---|---|---|
| 15 | CMD_BUSY | Command Busy (RO)<br>0: not busy<br>1: busy<br>This bit will be cleared when the current command has completed. |
| 14 | EEPROM_BUSY | EEPROM Busy (RO)<br>0: not busy<br>1: busy, EEPROM device address was not acknowledged during GET_KEY<br>This bit will be cleared upon writing to this register. |
| 13 | EEPROM_ERROR | EEPROM Error (RO)<br>0: no error<br>1: error, EEPROM word address, or write data was not acknowledged or device address was not acknowledged after a 15 ms timeout.<br>This bit will be cleared upon writing to this register. |
| 12:9 | N/A | (RO) '0 000' |
| 8 | SDRAM_CLEAR | SDRAM_CLEAR (RO)<br>0: SDRAM_CLEARED was not asserted.<br>1: SDRAM_CLEARED was asserted.<br>This bit will be cleared upon writing to this register. |
| 7:6 | KEY_STAT | Key Compare Status (RO)<br>00: no result<br>01: Key Match<br>10: Key Mismatch, or no old key had been loaded<br>11: Comparison being made |
| 5:4 | PW_STAT | Password Compare Status (RO)<br>00: no result, password cleared<br>01: Password Valid<br>10: Password Invalid<br>11: Comparison being made |

FIG. 8A

| Bit # | Bit Mnemonic | Function |
|---|---|---|
| 3:0 | MODE[3:0] | Key Mode (RO)<br>0000 : Insecure<br>0001 : Clear_SDRAM<br>0010 : Insecure_Debug<br>0011 : Get_Key<br>0100 : Key_Loaded<br>0101 : Compare_Keys<br>0110 : Add_Key<br>0111 : Remove_Key<br>1000 : Change_Key<br>1001 : Update_Key<br>1010 : Secure<br>1011 : Compare_Keys2<br>1100 : Validate<br>1101 : Secure_Debug<br>1110 : not valid<br>1111 : not valid |

FIG. 8B

| SEC Version Control Register | | | | | Address: | | see SEC Register Map, Table 5.11-1 | |
|---|---|---|---|---|---|---|---|---|
| SEC-VER_CTRL | | | | | Reset State: | | 0x0FFF | |
| Read Only | | | | | Access : | | 16 bit | |
| 15 | 14 | 13 | 12 | 11 | 10 | 9 | 8 |
| VER[3:0] | | | | REV[11:8] | | | |
| 7 | 6 | 5 | 4 | 3 | 2 | 1 | 0 |
| REV[7:0] | | | | | | | |

| Bit # | Bit Mnemonic | Function |
|---|---|---|
| 15:12 | VER[3:0] | Version (RO)<br><br>VER is a unique value that increments from 0-15 for every change in the design that affects more than just the metal layer.<br><br>i.e. a new gate level netlist would include the VER[3:0] being incremented.<br><br>VER[3:0] is also visible in the JTAG ID scan register. |
| 11:0 | REV[11:0] | Revision (RO)<br><br>REV[11:0] identifies 11 unique changes at each VERSION level. Bits in REV are incrementally grounded for each revision in the metal layer according to the scheme below.<br><br>REV[9:0] = 1111 1111 1111 = REV not registered (see note note 1)<br>REV[9:0] = 1111 1111 1110 = 1<br>REV[9:0] = 1111 1111 1100 = 2<br>...<br>REV[9:0] = 0000 0000 0000 = 11 |

NOTES:
1) A configuration bus write to any address must be performed before REV[11:0] is updated with valid data.

FIG. 9

| SEC Password Register Field | | Base Address: | see SEC Register Map, Table 5.11-1 |
|---|---|---|---|
| SEC-PW | | | |
| MCU_ADDR OFFSET | REG Mnemonic | REG Bits (D[15:0]) | Reset State |
| 0xE | SEC-PW7 | PW[127:112] | 0x0000 |
| 0xC | SEC-PW6 | PW[111:96] | 0x0000 |
| 0xA | SEC-PW5 | PW[95:80] | 0x0000 |
| 0x8 | SEC-PW4 | PW[79:64] | 0x0000 |
| 0x6 | SEC-PW3 | PW[63:48] | 0x0000 |
| 0x4 | SEC-PW2 | PW[47:32] | 0x0000 |
| 0x2 | SEC-PW1 | PW[31:16] | 0x0000 |
| 0x0 | SEC-PW0 | PW[15:0] | 0x0000 |

| Bit Mnemonic | Function |
|---|---|
| PW[127:0] | Password (W only)<br><br>This field contains the password that is used for comparision purposes, and for the password that is linked with a new encryption keys.<br><br>The full password must be entered while in Key_Loaded, Secure, or the Validate states in order to execute the ADD_KEY, REMOVE_KEY, CHANGE_KEY, or COMPARE commands. Otherwise, transition from those states is prohibited. |

FIG. 10

| SEC Key Seed Register Field | | Base Address: | see SEC Register Map, Table 5.11-1 |
|---|---|---|---|
| SEC-KS | | | |
| MCU_ADDR OFFSET | REG Mnemonic | REG Bits (D[15:0]) | Reset State |
| 0xE | SEC-KS7 | KS[127:112] | 0x0000 |
| 0xC | SEC-KS6 | KS[111:96] | 0x0000 |
| 0xA | SEC-KS5 | KS[95:80] | 0x0000 |
| 0x8 | SEC-KS4 | KS[79:64] | 0x0000 |
| 0x6 | SEC-KS3 | KS[63:48] | 0x0000 |
| 0x4 | SEC-KS2 | KS[47:32] | 0x0000 |
| 0x2 | SEC-KS1 | KS[31:16] | 0x0000 |
| 0x0 | SEC-KS0 | KS[15:0] | 0x0000 |

| Bit Mnemonic | Function |
|---|---|
| KS[127:0] | Key Seed (W only) This field contains the key seed which XOR with the current key and current password to obtain a new key. |

FIG. 11

| VER[3:0] | REV[11:0] | ASIC Description |
|---|---|---|
| 0b0000 | 0b111111111111 | Reset Value |
| 0b0001 | 0b111111111110 | Initial Version |
| | | |

FIG. 12

| Pin Name | I/O | Description |
|---|---|---|
| TESTMODE[1:0] | Input | Test Mode Select |
| TDI | Input | JTAG Test Data Input |
| TDO | Output | JTAG Test Data Output |
| TCK | Input | JTAG Test Clock |
| TMS | Input | JTAG Test Mode Select |

FIG. 15

| TESTMODE[1:0] | MODE |
|---|---|
| 00 | Normal Operation, JTAG enabled |
| 01 | Normal Operation, JTAG reset |
| 10 | Test Mode, Scan enabled |
| 11 | Test Mode, Access to PLL, BIST, SRAM |

FIG. 16

| Register | Length | Cell Type | Description |
|---|---|---|---|
| Instruction | 4 | IR cell | Contains/controls the instruction to be performed |
| Boundary Scan | 250* | BC_1 cell | Contains/controls all the I/O's to Killbear |
| ID Code | 32 | ID cell | Contains the chip's part, manufacturer and version number |
| Configuration | 31 | IR cell | Allows for reading and writing to configuration registers via the MIC.<br>bits (30:16) = address<br>bits (15:0) = data |
| Bypass | 1 | BR cell | Allows for the bypassing of the Killbear JTAG logic |

FIG. 17

| OPCODE | Mnemonic | Description |
|---|---|---|
| 0000 | EXTEST | Allows testing of off-chip circuitry and board interconnections |
| 0001 | SAMPLE/PRELOAD | |
| 0010 | INTEST | Allows testing of on-chip system logic |
| 0011 | unused | Defaults to BYPASS instruction |
| 0100 | CFG_READ_REQUEST | Allows cfg register read requests |
| 0101 | CFG_RETURN_READ_DATA | Allows the capture of read data requested by an update signal in CFG_READ_REQUEST |
| 0110 | CFG_WRITE | Allows cfg register writes |
| 0111 | unused | Defaults to BYPASS instruction |
| 1000 | unused | Defaults to BYPASS instruction |
| 1001 | unused | Defaults to BYPASS instruction |
| 1010 | unused | Defaults to BYPASS instruction |
| 1011 | unused | Defaults to BYPASS instruction |
| 1100 | unused | Defaults to BYPASS instruction |
| 1101 | unused | Defaults to BYPASS instruction |
| 1110 | IDCODE | Allows the chip ID to be read out |
| 1111 | BYPASS | Allows the bypassing of the chip's data registers |

FIG. 22

| | Version Number (see SEC) | Part Number | Manufacturer | lsb |
|---|---|---|---|---|
| Bits | 31:28 | 27:12 | 11:1 | 0 |
| Contents | VER[3:0] | 1011 1110 1010 1000 | 0000 0011 111 | 1 |

FIG. 23

DEBUGGING PORT SECURITY INTERFACE

CROSS-REFERENCE TO RELATED APPLICATIONS

This application is a continuation of U.S. patent application Ser. No. 12/325,853, filed Dec. 1, 2008, which is a continuation of U.S. patent application Ser. No. 11/049,987, filed Feb. 4, 2005, which claims the benefit of U.S. Provisional Application No. 60/542,173, filed on Feb. 5, 2004. U.S. patent application Ser. No. 11/049,987 issued to patent as U.S. Pat. No. 7,461,407. The entire contents of U.S. application Ser. No. 12/325,853, U.S. patent application Ser. No. 11/049,987 and of U.S. Patent Application No. 60/542,173, are hereby incorporated by reference.

BACKGROUND

1. Technical Field

This invention relates to data processing devices. In particular, this invention relates to a security interface for debugging a central processing unit in a data processing device.

2. Description of Related Art

The use of portable data processing systems has increased significantly in recent years. In addition to so called "laptop" and "tablet" computers, there is a growing popularity in handheld data processing devices, often called a "personal digital assistant" or "PDA." All of these devices are capable of storing a significant amount of user data, including calendar, address book, tasks and numerous other types of data for business and personal use. Most handheld data processing devices have the ability to connect to a personal computer for data exchange, and many are equipped for wireless communications using, for example, conventional email messaging systems. Depending upon the user's needs much of this data can be highly sensitive in nature, especially for example in a government, military or commercial context.

There are two competing parameters in any high security embedded system. The first is to prevent an attacker from accessing secure data or taking control of the system. The second is to allow an embedded software developer to debug the system, both during development and after the product has been launched. A common debug mechanism available in embedded systems is known as the "JTAG" port, which is essentially a back door into the system. The JTAG port can be used to communicate with the processor, read from and write to memory locations, and access boundary scan. Furthermore, several chips can be chained together so that one JTAG port can be used to access several chips.

Portable data processing systems are typically password protected, which can be effective security against attack through the normal operation of the device. However, it may be possible for a technically sophisticated individual with malicious intent to bypass the normal system security entirely by attacking the system through the JTAG port.

One possible way to prevent this is to create a development version of the chip with full debugging capability, and after it has been tested and debugged, create a new version of the chip for commercial sale which has no or very limited debugging capability. This results in considerable cost and time inefficiencies, and the loss of after-market debugging capability in the commercial version of the chip. Another possibility is to disable the JTAG port after the chip has been tested and debugged, but again this curtails debugging capability after commercial sale.

Protecting the JTAG port against an attack while allowing for effective debugging of the system has accordingly been a difficult problem.

SUMMARY

In accordance with an aspect of the invention, a device for allowing secure access to a processing device is provided, the device comprising a microprocessor; a control module connected to the microprocessor, the control module being configured to access at least one memory component; a test control module connected to the control module, the test control module comprising an access port interface; a security module connected to the test control module having restricted and unrestricted security states, wherein in a restricted security state, access to the at least one memory component via the access port interface is not permitted, and in an unrestricted security state, access to the at least one memory component via the access port interface is permitted; the state of the security module being alterable between a restricted and an unrestricted state if a password supplied through the access port interface matches a predetermined password stored in a secure, non-volatile memory accessible by the security module. The access port interface is a debugging port interface, such as a JTAG interface.

Yet a further aspect is that the access port interface is connected to additional processing devices, such that when the security module is in an unrestricted security state, commands submitted through the access port interface may be directed to the additional processing devices.

In a further aspect, the device further comprises a data encryption module for encrypting and decrypting data to be written to or read from the at least one memory component, such that all data written to a non-volatile portion of the at least one memory component is encrypted, wherein the state of the security module is alterable between a restricted state and an unrestricted state, such that in the restricted state, access via the access port interface to only encrypted data contained in the non-volatile portion of the at least one memory component is permitted, and in the unrestricted state, access via the access port interface to the control module, data encryption module, and all data contained in the at least one memory component is permitted. Thus, access to the data stored on the at least one memory component comprises access to data decrypted from the encrypted data, such that when the security module is in the restricted state, only access via the access port interface to encrypted data is permitted, and when the security module is in the unrestricted state, access via the access port interface to the control module and data encryption module is permitted such that the data encryption module may decrypt the encrypted data and provide access to the decrypted data via the access port interface.

In accordance with a further aspect of the invention, a method for allowing secure access to a processing device storing encrypted data is provided, the method comprising the steps of receiving a request for access via an access port interface; if the request for access comprises a password, comparing the password to a predetermined password stored in secure, non-volatile memory; if the received password matches the predetermined password, permitting access to the decrypted content of at least one memory device; if the received password does not match the predetermined password, or if the request for access does not comprise a password, permitting access only to encrypted content of at least one memory device. The at least one memory devices preferably comprises non-volatile memory, and encryption/decryption component, which is used to decrypt encrypted data if the received password matches the predetermined password.

BRIEF DESCRIPTION OF THE DRAWINGS

In drawings which illustrate by way of example only a preferred embodiment of the invention.

FIG. 4 is a block diagram of a Security Module contained in the security interface for in the data processing device of FIG. 2.

FIG. 6 is a Configuration Registers Map for the Security Module of FIG. 4.

FIGS. 7A and 7B are first and second parts of a Control Register table for the Security Module of FIG. 4.

FIGS. 8A and 8B are first and second parts of a Status Register table for the Security Module of FIG. 4.

FIG. 9 is a Version Control Register table for the Security Module of FIG. 4.

FIG. 10 is a Password Register Field table for the Security Module of FIG. 4.

FIG. 11 is a Key Seed Register Field table for the Security Module of FIG. 4.

FIG. 12 is a table showing the correspondence between the Security Module version control register and a particular ASIC.

FIG. 15 is a JTAG External Signals table for the security interface of the invention.

FIG. 16 is a Test Modes table for the security interface of the invention.

FIG. 17 is a Test Control Module Test Shift Registers table for the security interface of the invention.

FIG. 22 is a JTAG Operating Codes table for the security interface of the invention.

FIG. 23 is a JTAG ID table for the security interface of the invention.

DETAILED DESCRIPTION

The present invention provides a secure JTAG interface to an application-specific integrated circuit (ASIC). In the preferred embodiment the invention operates through the combined efforts of a Security Module (SM) comprising a state machine that controls the security modes for the ASIC, and a Test Control Module (TCM) which contains the JTAG interface. The TCM operates in either a restricted mode or an unrestricted mode, depending on the state of the SM state machine.

In restricted mode, the JTAG has access to the chip ID code and to the SM registers only, and the internal and external memory contents cannot be downloaded. In addition, the Test Data Output (TDO) pin is forced to a logic one level except for reads from the ID code or SM registers. This prevents communication with chips further down the JTAG chain. In unrestricted mode, the JTAG is fully functional and the TDO is enabled.

The SM has many security states. The TCM is in restricted mode for each of the SM's states except for the secure debug state and the insecure debug state. The SM state machine powers up in the restricted non-debug state. Through the JTAG port, the SM state machine can be controlled to transition to other security states. In order to transition to the unrestricted secure debug state, the correct password must be given. The password is stored in on-chip non-volatile memory and can only be accessed by the SM. In the unrestricted mode, for example, the JTAG port can be used to access boundary scan, access every memory location and communicate with chips further down the chain.

The password is not necessary in order to transition to the insecure debug state. Even though the TCM is in unrestricted mode while in the insecure debug state, data encryption and decryption of the memory contents is disabled. As a result, the encrypted data in memory is protected. In addition, before entering the insecure debug state, the entire contents of SDRAM are overwritten to zeros so that the unencrypted data stored in SDRAM cannot be read through the JTAG port. Flash memory contents are mostly encrypted while SDRAM memory contents are not encrypted.

The invention accordingly provides a level of security to the JTAG port which is comparable to the level of security in the normal operation of the device. This avoids having to create different chips for development and commercialization, or disabling the JTAG port following development.

Figure 1:
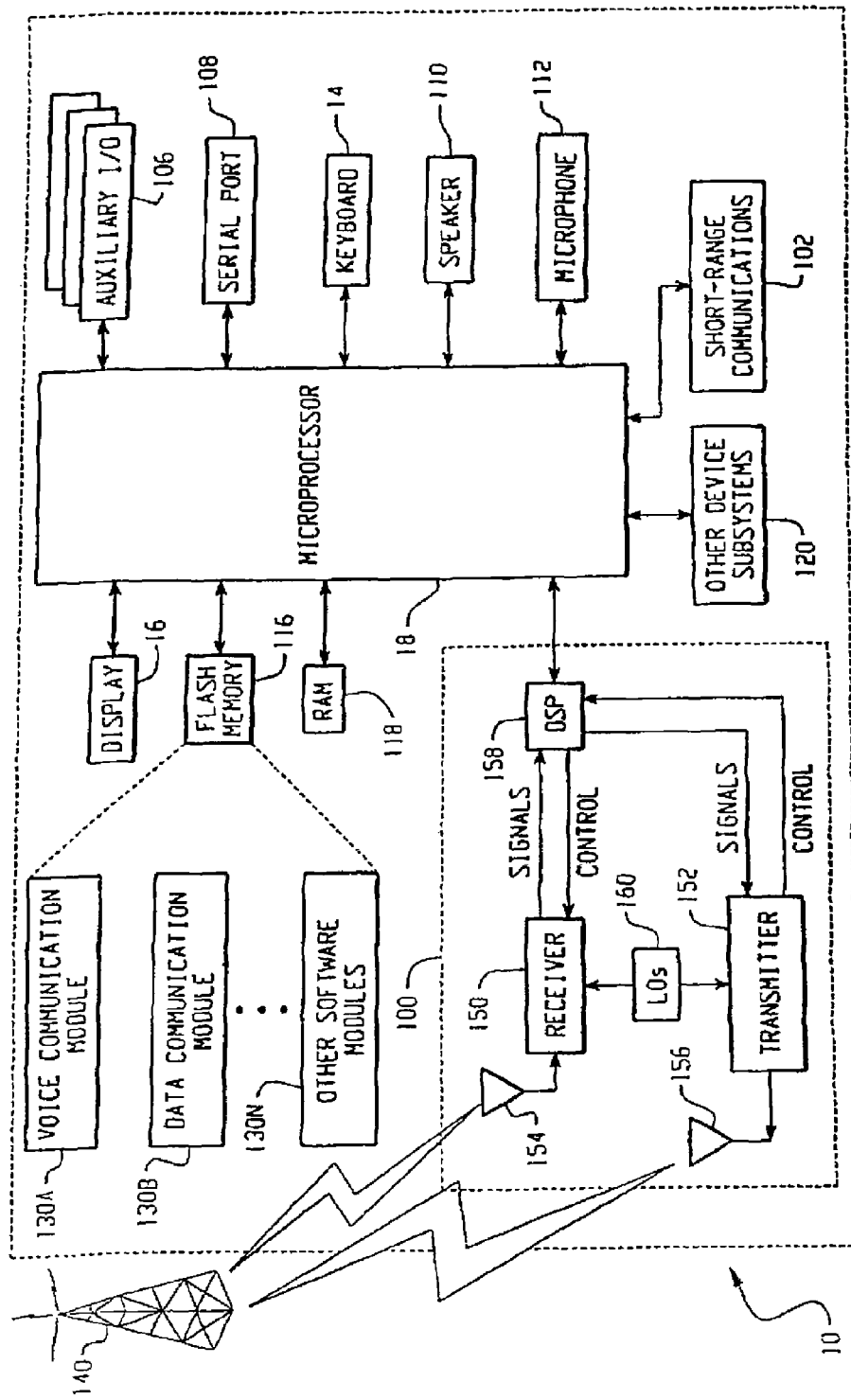
FIG. 1 is a block diagram of a system overview of a conventional hand-held data processing device.
Figure 2:
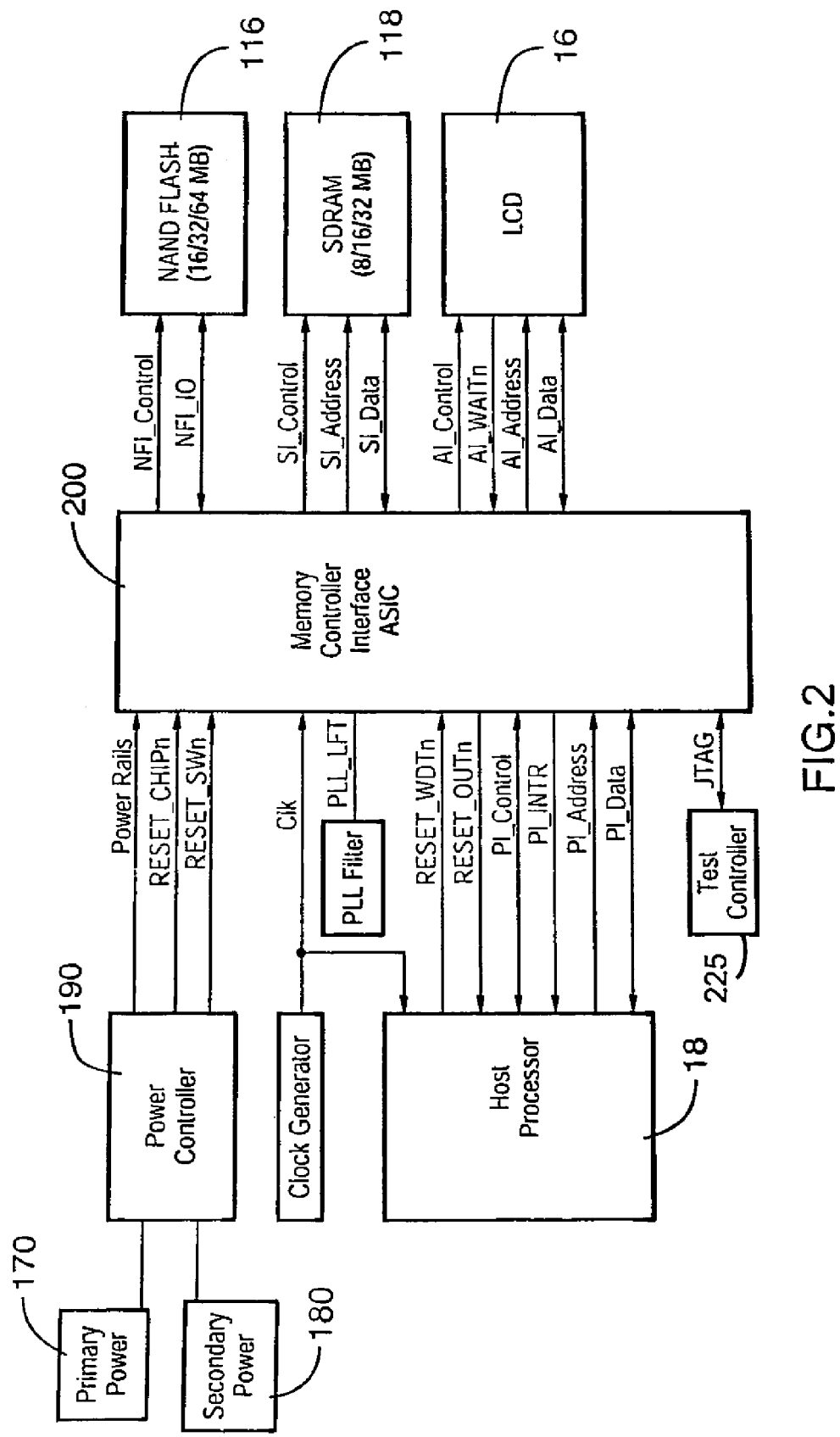
FIG. 2 is a system interface block diagram of a data processing device according to the invention.
Figure 3A:
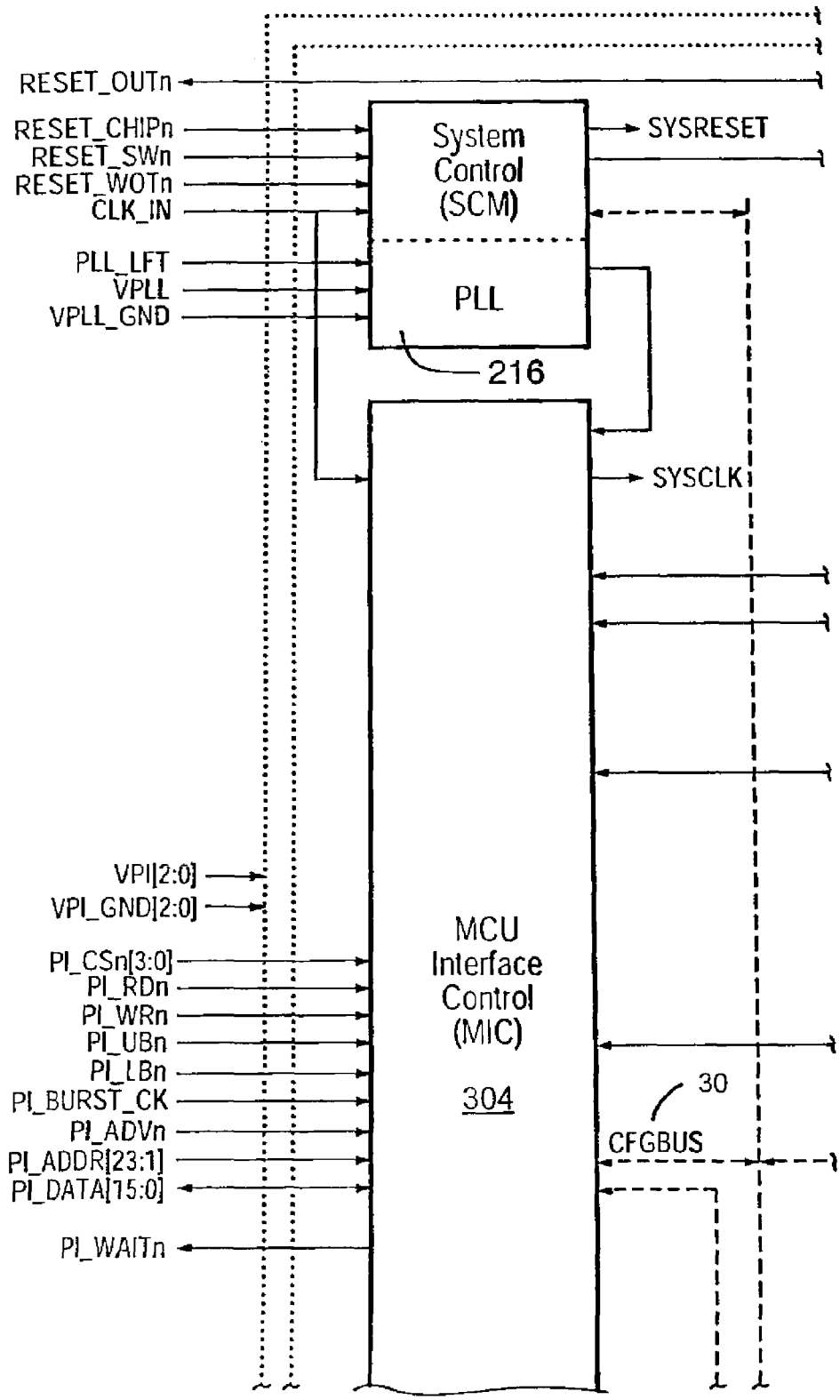
FIG. 3 and its component parts A through I are parts of a detailed block diagram of the memory controller interface in the data processing device of FIG. 2.
Figure 3B:
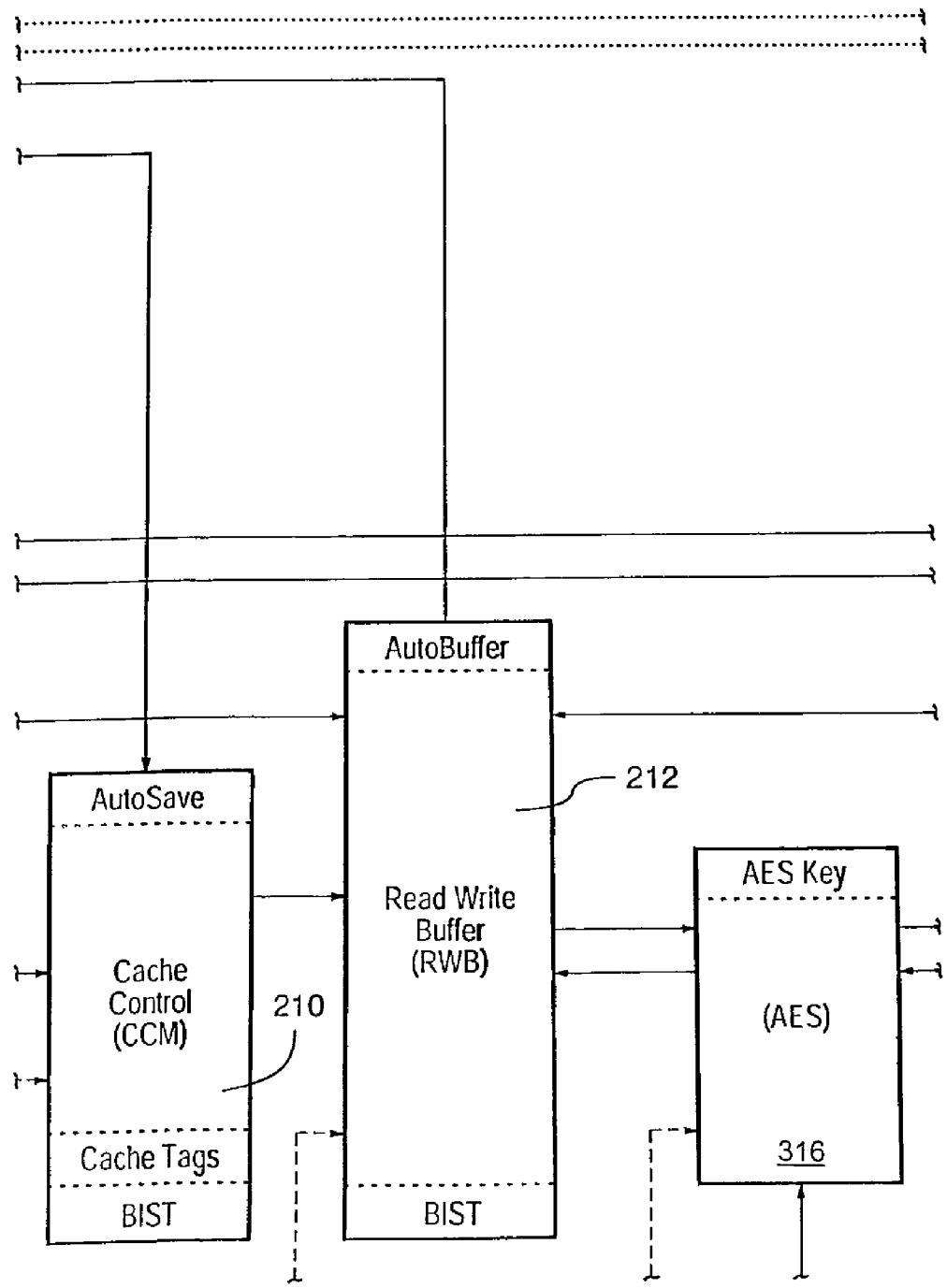
Figure 3C:
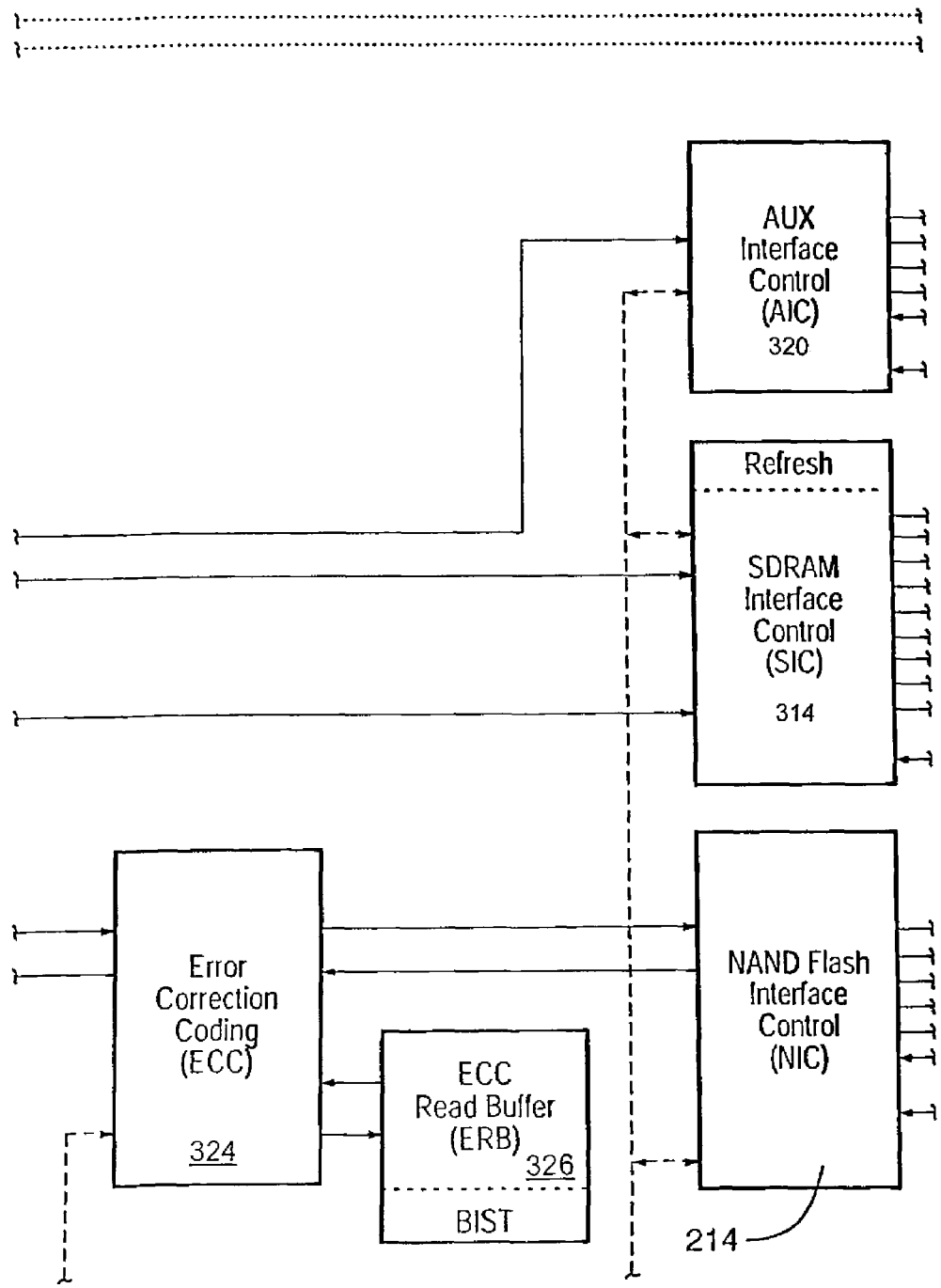
Figure 3D:
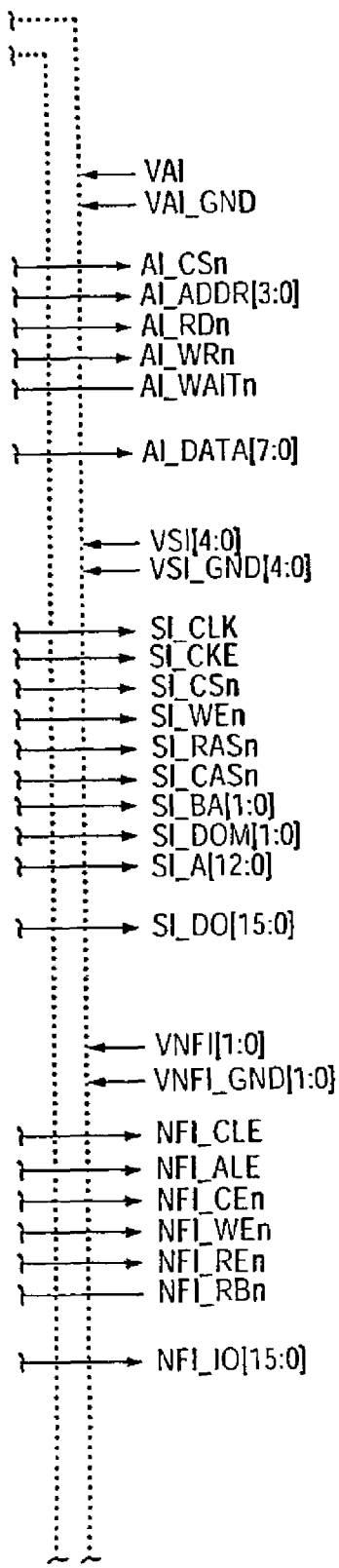
Figure 3E:
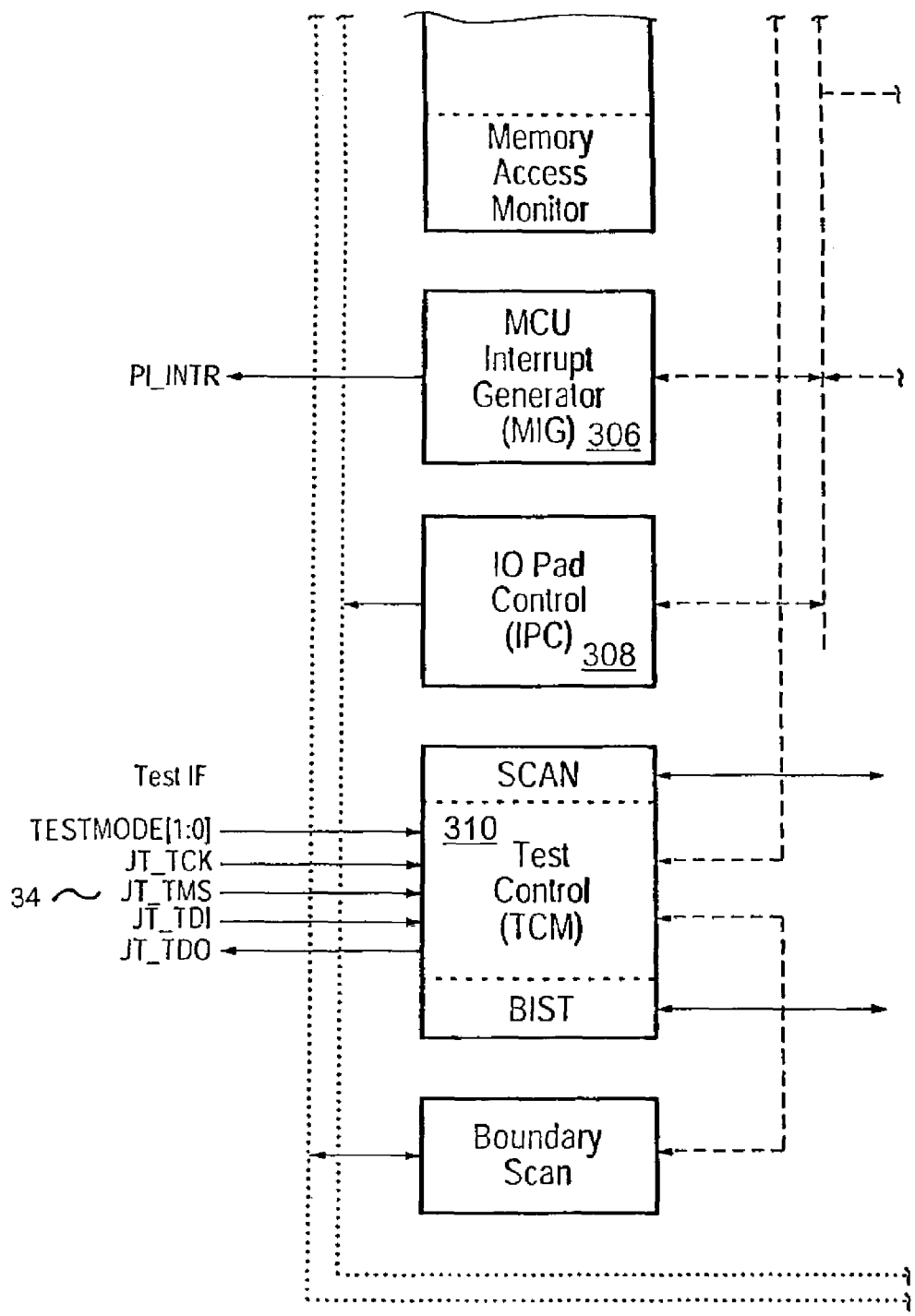
Figure 3F:
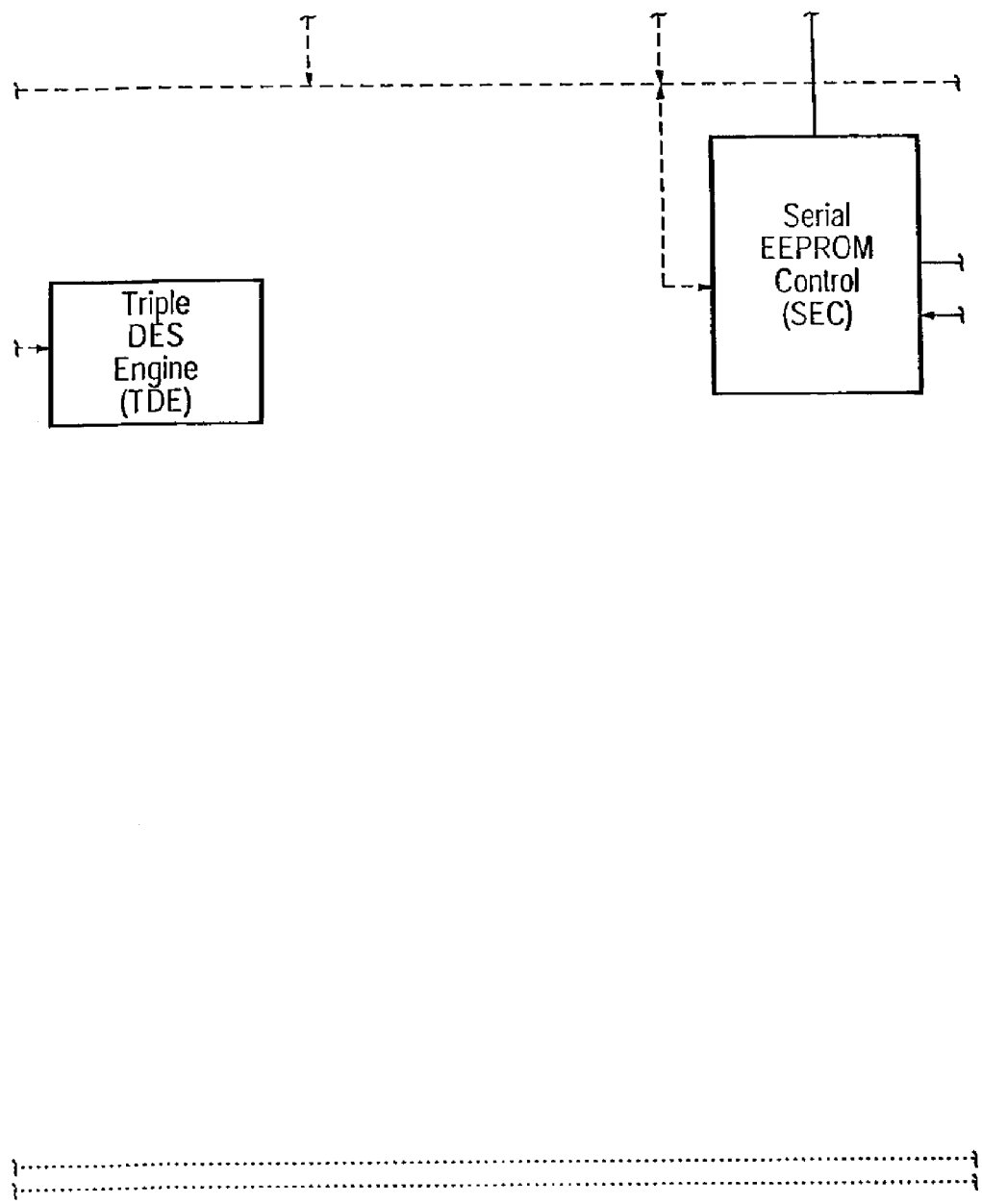
Figure 3G:
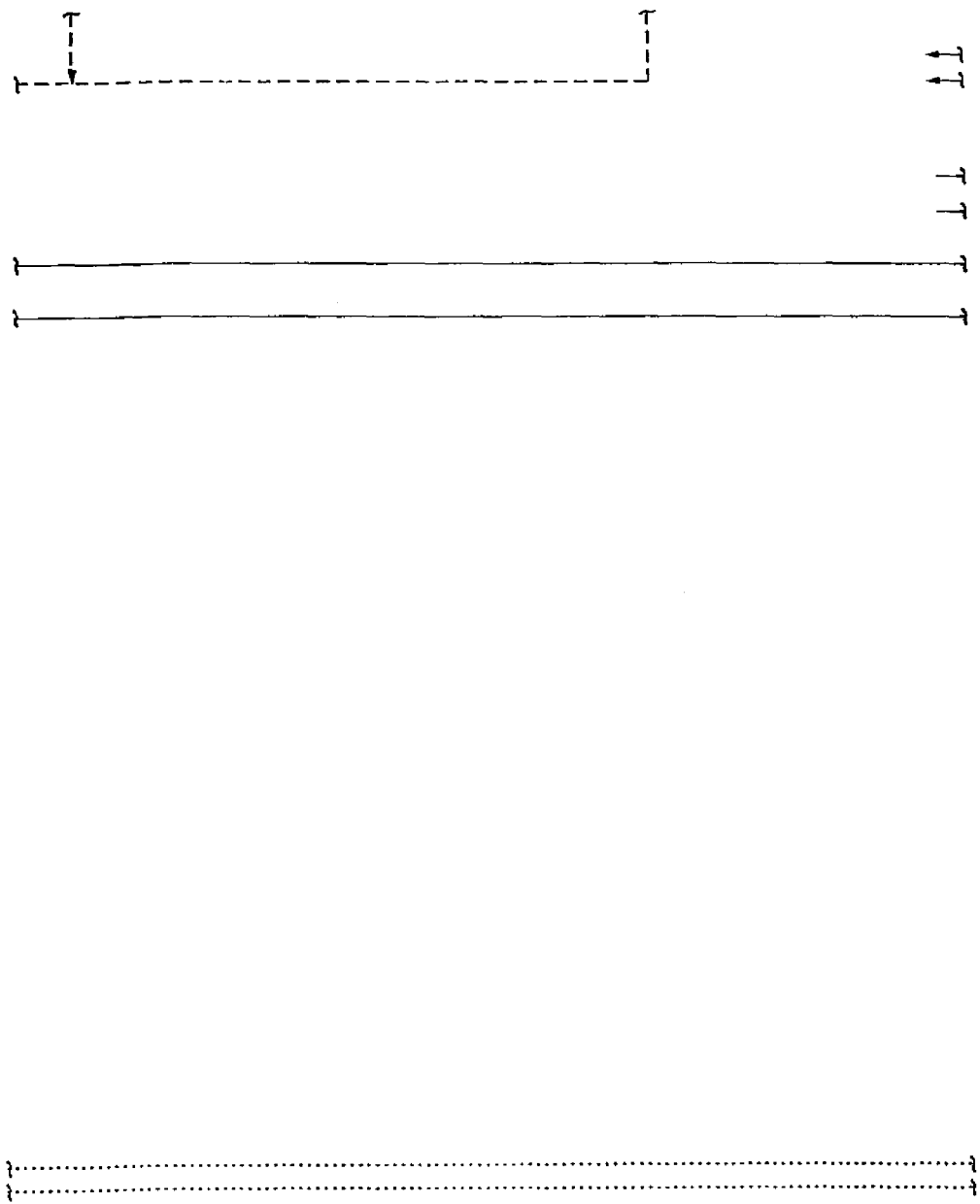
Figure 3H:
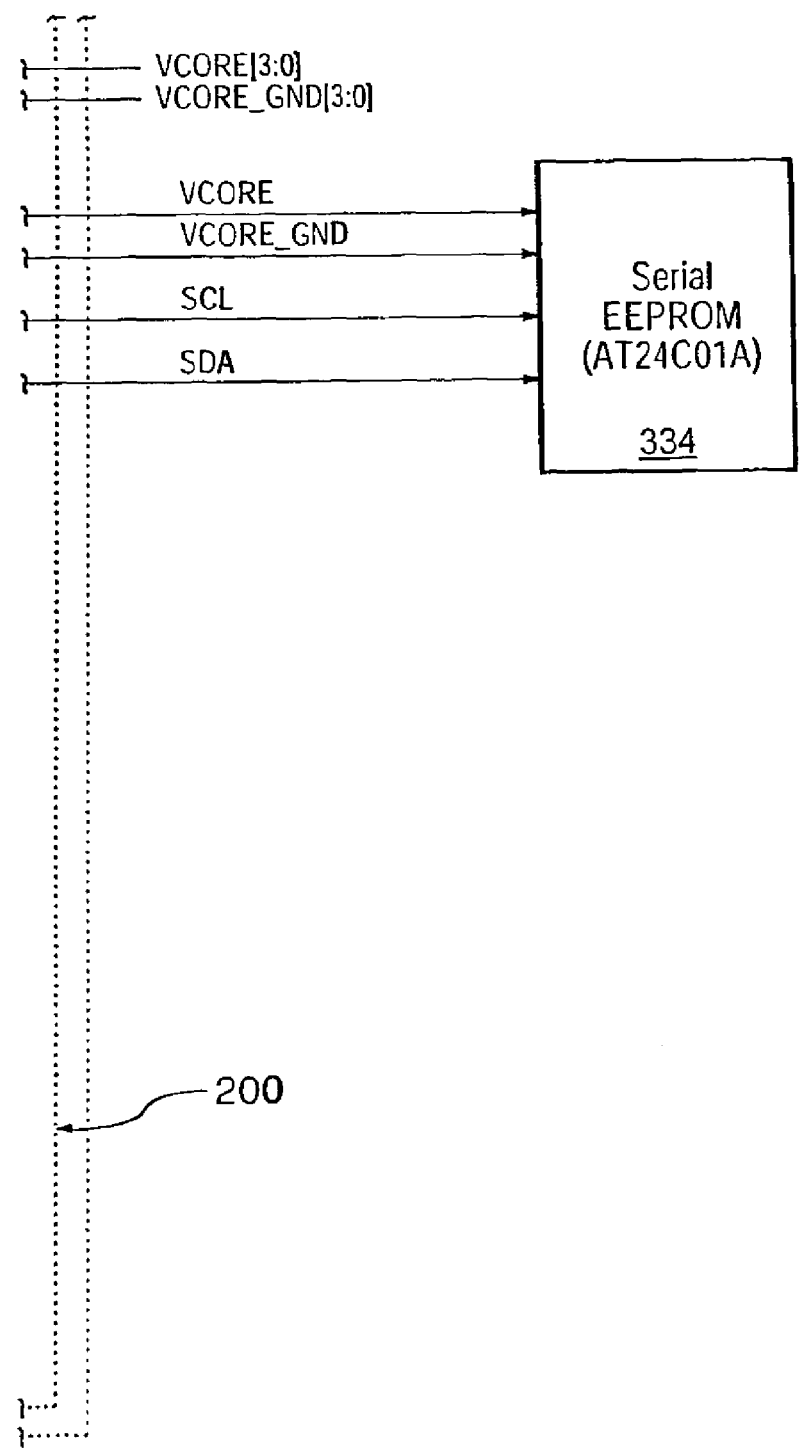

The invention will be described in detail below, by way of example only, in the context of a hand-held data processing device having wireless communications capabilities as illustrated in FIGS. 1 to 3. However, it will be appreciated that the principles of the invention apply to other data processing devices and the invention is not intended to be limited thereby.

The hand-held mobile communication devices 10 include a housing, a keyboard 14 and an output device 16. The output device shown is a display 16, which is preferably a full graphic LCD. Other types of input and output devices may alternatively be utilized. A processor 18, which is shown schematically in FIG. 1, is contained within the housing and is coupled between the keyboard 14 and the display 16. The processor 18 controls the operation of the display 16, as well as the overall operation of the mobile device 10, in response to actuation of keys on the keyboard 14 by the user.

The housing may be elongated vertically, or may take on other sizes and shapes (including clamshell housing structures). The keyboard may include a mode selection key, or other hardware or software for switching between text entry and telephony entry.

In addition to the processor 18, other parts of the mobile device 10 are shown schematically in FIG. 1. These include a communications subsystem 100; a short-range communications subsystem; the keyboard 14 and the display 16, along with other input/output devices 106, 108, 110 and 112; as well as memory devices 116, 118 and various other device subsystems 120. The mobile device 10 is preferably a two-way RF communication device having voice and data communication capabilities. In addition, the mobile device 10 preferably has the capability to communicate with other computer systems via the Internet.

Operating system software executed by the processor 18 is preferably stored in a persistent store, such as a flash memory 116, but may be stored in other types of memory devices, such as a read only memory (ROM) or similar storage element. In addition, system software, specific device applications, or parts thereof, may be temporarily loaded into a volatile store, such as a random access memory (RAM) 118. Communication signals received by the mobile device may also be stored to the RAM 118.

The processor 18, in addition to its operating system functions, enables execution of software applications 130A-130N on the device 10. A predetermined set of applications that control basic device operations, such as data and voice communications 130A and 130B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 140. Preferably, the PIM data items are seamlessly integrated, synchronized and updated via the wireless network 140 with the device user's corresponding data items stored or associated with a host computer system.

Communication functions, including data and voice communications, are performed through the communication subsystem 100, and possibly through the short-range communications subsystem. The communication subsystem 100 includes a receiver 150, a transmitter 152, and one or more antennas 154 and 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile device 10 is intended to operate. For example, a mobile device 10 may include a communication subsystem 100 designed to operate with the Mobitex™, Data TAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile device 10.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 10 may send and receive communication signals over the communication network 140. Signals received from the communication network 140 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g. modulated and encoded) by the DSP 158 and are then provided to the transmitter 152 for digital to analog conversion, frequency up conversion, filtering, amplification and transmission to the communication network 140 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

In a data communication mode, a received signal, such as a text message or web page download, is processed by the communication subsystem 100 and is input to the processor 18. The received signal is then further processed by the processor 18 for an output to the display 16, or alternatively to some other auxiliary I/O device 106. A device user may also compose data items, such as e-mail messages, using the keyboard 14 and/or some other auxiliary I/O device 106, such as a touchpad, a rocker switch, a thumb-wheel, or some other type of input device. The composed data items may then be transmitted over the communication network 140 via the communication subsystem 100.

In a voice communication mode, overall operation of the device is substantially similar to the data communication mode, except that received signals are output to a speaker 110, and signals for transmission are generated by a microphone 112. Alternative voice or audio I/O subsystems, such as a voice message recording subsystem, may also be implemented on the device 10. In addition, the display 16 may also be utilized in voice communication mode, for example to display the identity of a calling party, the duration of a voice call, or other voice call related information.

The short-range communications subsystem enables communication between the mobile device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

The invention relates to a security interface for debugging a central processing unit in a data processing device.

The user is able to access the Security Module through the configuration bus interface 30, as shown in FIG. 3. The configuration bus 30 is controllable from the MCU Interface Control (MIC) 304, and from the JTAG interface 34 contained within the Test Control Module (TCM) 310. When the JTAG interface 34 is used, the additional ENTER_DEBUG command is permitted.

Figure 5:
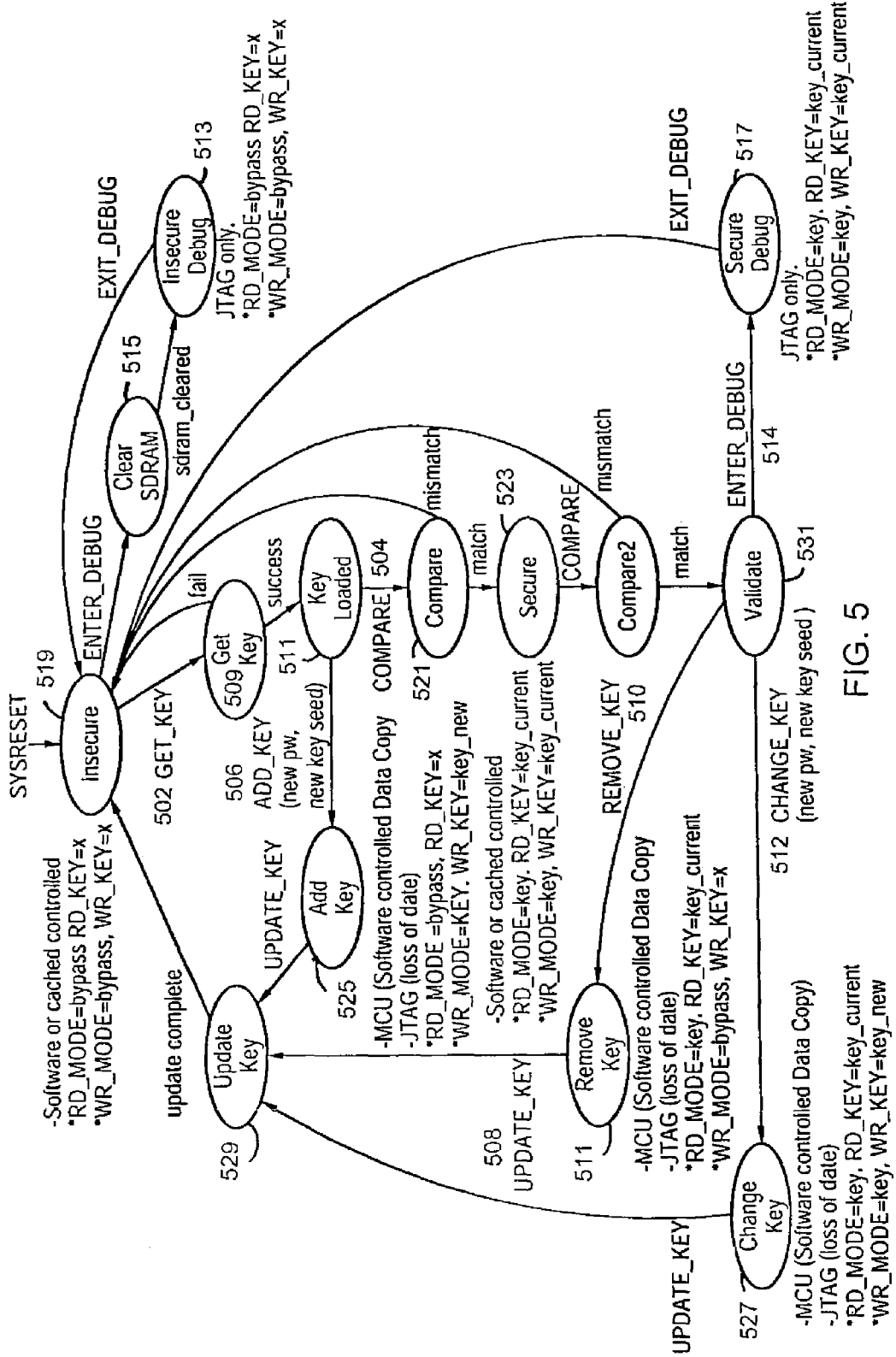
FIG. 5 is a state diagram for the Security Module of FIG. 4.

The following commands, as shown in FIG. 5, can be executed in the operation of the Security Module described above:

The GET_KEY 502 command is issued when CMD [2:0]="000" is written to the SM-CTRL register. This command retrieves the current key and password set from the on-chip non-volatile memory 334. The key and password set is determined by KEY_SELECT[1:0] found in the SM-CTRL register.

The COMPARE_KEYS 504 command is issued when CMD [2:0]="001" is written to the SM-CTRL register. This command provides the results of two comparisons. It compares the current password with the test password, and it compared the current key with the previously written key. The results are provided in the SM-STATUS register.

The ADD_KEY 506 command is issued when CMD [2:0]="010" is written to the SM-CTRL register. This command forms the new key from the current password, current key, and the software supplied key seed. This new key can be used in the data copy operations. The new password is also supplied by software and will come into affect when the UPDATE_KEY 508 command is executed. The current key and current password are retrieved with the GET_KEY 502 command.

The REMOVE_KEY 510 command is issued when CMD[2:0]="011" is written to the SM-CTRL register. This command transitions to the Remove key state 511 where the data copy can be completed.

The CHANGE_KEY 512 command is issued when CMD[2:0]="100" is written to the SM-CTRL register. This command forms the new key from the current password, current key, and the software supplied key seed. This new key can be used in the data copy operations. The new password is also supplied by software and will come into effect when the UPDATE 508 command is executed. The current key and current password are retrieved with the GET_KEY 502 command. Reading the SM_STATUS register provides the current key state status.

The UPDATE_KEY 508 command is issued when CMD[2:0]="101" is written to the SM-CTRL register. The generated key and password are written into non-volatile memory 334 at the KEY_SELECT location.

The ENTER_DEBUG 514 command is issued when CMD [2:0]="110" is written to the SM-CTRL register. This command must be executed from the JTAG interface 34. It transitions control to either the Insecure Debug state 513 (through Clear SDRAM 515) or to the Secure Debug state 517.

The ENTER_DEBUG command is issued when CMD [2:0]="111" is written to the SM-CTRL register. This command transitions control to the Insecure state.

The following states are possible in the operation of the Security Module described above:

Insecure State: The device is powered up in the Insecure state 519. In this state, a password in not required, and a key is not used to read and write data to NAND flash 116.

Clear SDRAM 515: This state asserts the CLEAR_SDRAM signal for the SM. Transfer to the Insecure Debug state 513 will be completed upon receiving the SDRAM_CLEAR signal from the SM. Clearing SDRAM 24 prohibits the use of the JTAG interface 34 to read the previous contents of SDRAM 24 in Debug mode.

Insecure Debug 513: This state asserts the DEBUG_EN signal, allowing the TCM 310 debug functions with the encryption module 316 in bypass mode. Executing the EXIT_DEBUG 516 command will transition control to the Insecure state.

Get Key 509: This state is entered with the Get_Key command. The password and key set is read from the non-volatile memory 334. If successful, the current key and current password are updated and the SM is transferred to the key loaded state. The SM will be transferred back to the Insecure state 519 if the non-volatile memory 334 is busy writing, or if an error is encountered.

Key Loaded 511: This state is entered upon the successful read of the key and password from the non-volatile memory 334. A key comparison can be made by loading the compare keys commands, or a new key can be created by loading the add key command.

Compare 521: In this state, the current password is compared with the test password, and the current key is compared with the key written. Results are available upon completion. If the passwords match, the SM will be transferred to the Secure state 523. If the passwords did not match, the SM will be transferred back to the Insecure state 519.

Add Key 525: In this state, software can read in unencrypted data and write back using the newly generated encryption key. Since reading is done in bypass mode, all previously stored encrypted data is lost. Once the data copy operation is complete, the UPDATE_KEY 508 command is used to write the new key and password to the non-volatile memory 334. The SM is transferred to the Insecure state 519 on completion.

Remove Key 511: The REMOVE_KEY 510 command allows software to read encrypted data with the current key, and to write data back with no key. Once the data transfer is complete, the UPDATE_KEY 508 command is executed to write the new key into non-volatile memory 334.

Change Key 527: The CHANGE_KEY 512 command allows software to read encrypted data with the current key, and to write data back with the new key. Once the data transfer is complete, the UPDATE_KEY 508 command is executed to write the new key into non-volatile memory 334.

Update Key 529: This state is entered with the UPDATE_KEY 508 command. The new password and newly form key are written to the non-volatile memory 334. On completion, the SM is transferred to the Insecure state 519.

Secure 523: In the Secure state 523, encrypted data is written to and read from NAND flash 116 using the current key. In this mode, the COMPARE 518 command must be executed. If the passwords match, the Validate state 531 will be entered. If the passwords do not match, the SM is transferred to the Insecure state 519.

Compare2 533: This state is entered from the Secure state 523. In this state, the current password is compared with the test password, and the current key is compared with the key written. Results are available upon completion. If the passwords match, the SM will be transferred to the Validate state 531. If the passwords did not match, the SM will be transferred back to the Insecure state 519.

Validate 531: This state ensures that a valid password is present prior to allowing the change of a key, the removal of a key, or the debugging with keys.

Secure Debug 517: This state asserts the DEBUG_EN signal, allowing the TCM 310 debug functions with the encryption module 36 operational. Executing the EXIT_DEBUG 516 command will transition the SM to the Insecure state 519.

Turning to FIG. 4, non-volatile memory 334 testing is accommodated with the use of the current key 42, the key written 44, and the key compare 46 blocks. A key can be generated and written into the non-volatile memory 334. This key can be read out and compared with the key written using the COMPARE 518 command and monitoring using the KEY_STATUS[1:0] found in the SM-STATUS register.

The TCM 310, comprised of the JTAG interface 34 and bs_reg blocks, is based on the IEEE Standard 1149.1 (IEEE Standard Test Access Port and Boundary-Scan Architecture), which is incorporated herein by reference.

The TCM 310 contains logic and shift registers with the following functionality:

JTAG boundary scan testing and monitoring of the chip

JTAG id code retrieval

Restricted mode to limit JTAG controller functionality to protect data from unauthorized access JTAG reads and writes to any configuration register Many of the other blocks perform major functions when their configuration registers are written to; therefore, via the JTAG configuration shift register, the following functions can be performed:

Erase, Write and Read of NAND Flash 116
Operation of the SM
BIST of Internal SRAM blocks.

Figure 13:
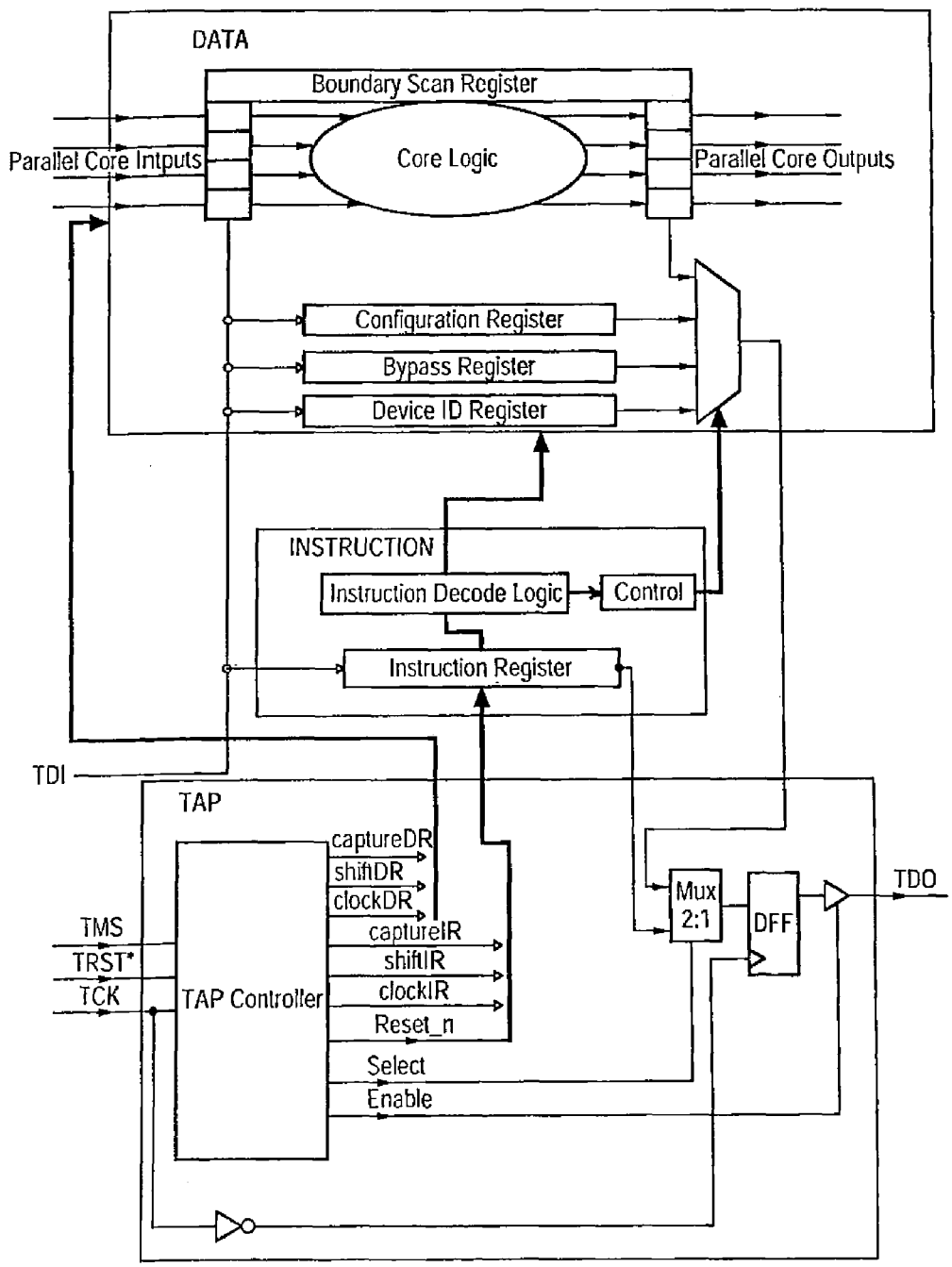
FIG. 13 is a block diagram showing an overview of the functionality of the JTAG port in the security interface of the invention.
Figure 14:
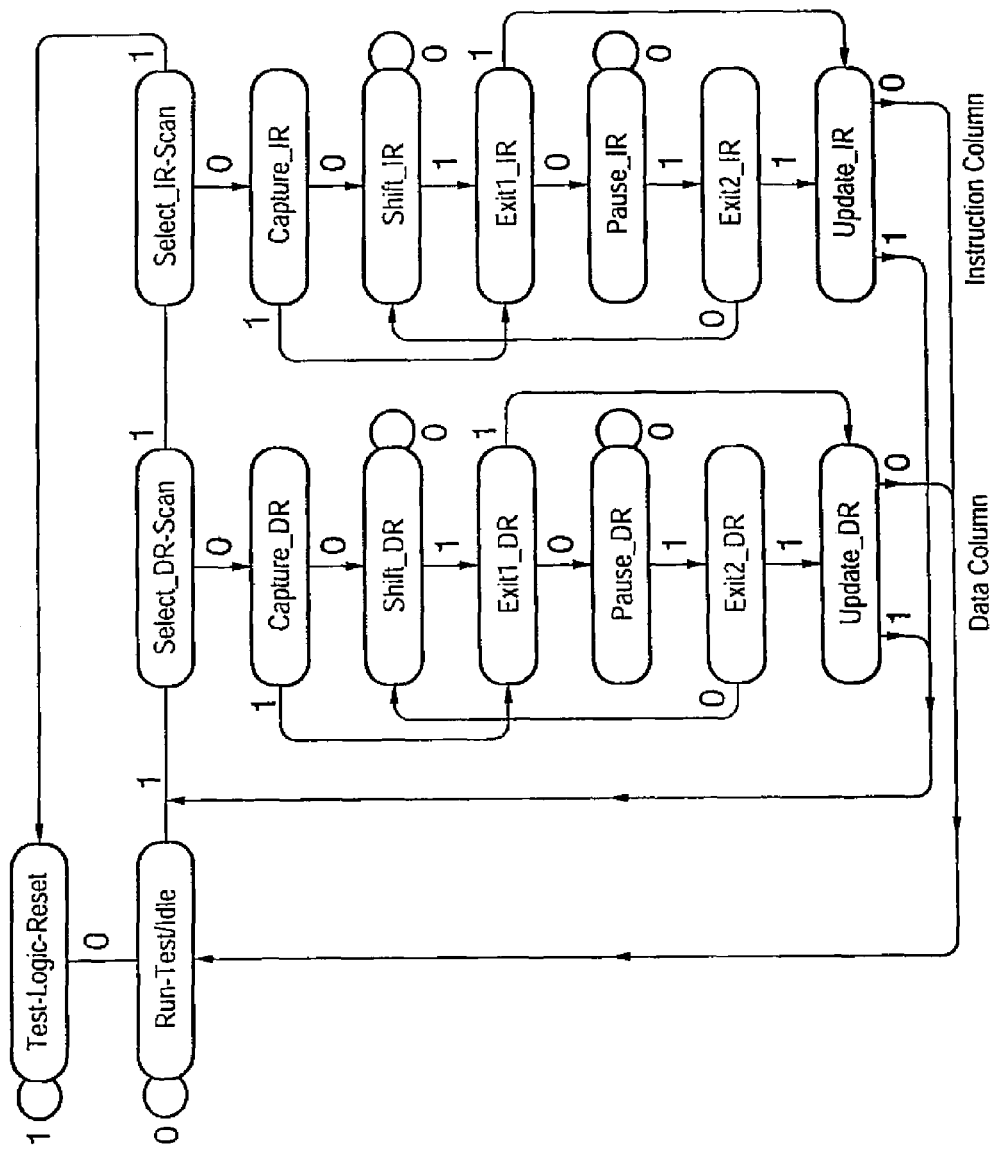
FIG. 14 is a Test Access Port (TAP) Controller State Diagram for the security interface of the invention.
Figure 18:
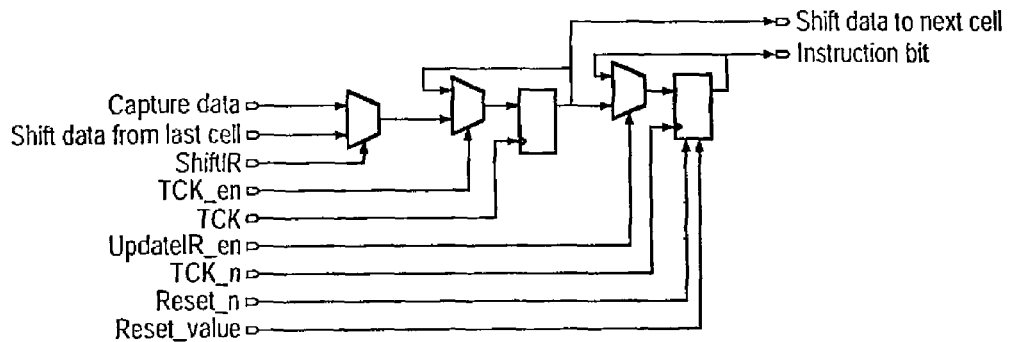
FIG. 18 is a schematic diagram showing a representative Instruction Register (IR) Cell in the shift register for the security interface of the invention.
Figure 19:
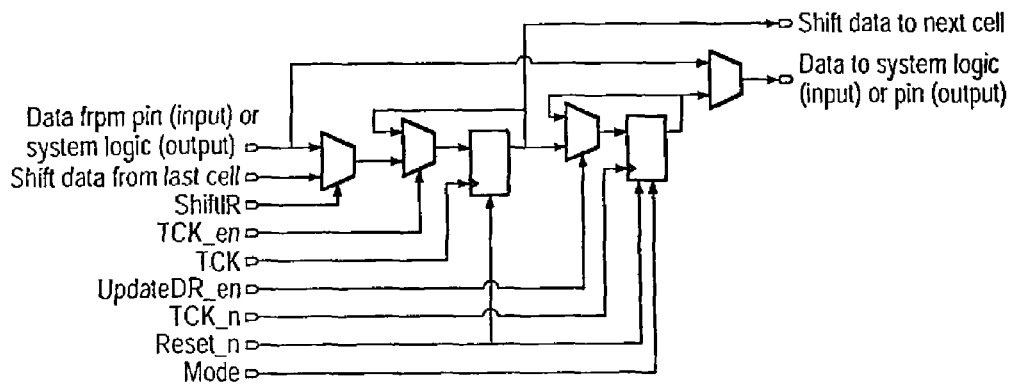
FIG. 19 is a schematic diagram showing a representative BC-1 Cell in the shift register for the security interface of the invention.
Figure 20:
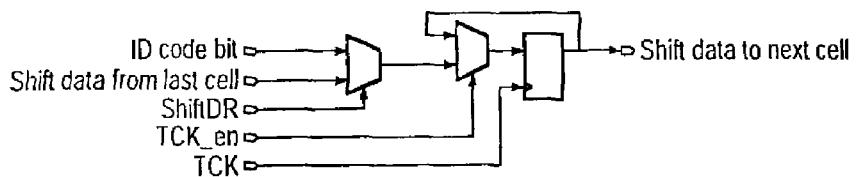
FIG. 20 is a schematic diagram showing a representative ID Cell in the shift register for the security interface of the invention.
Figure 21:
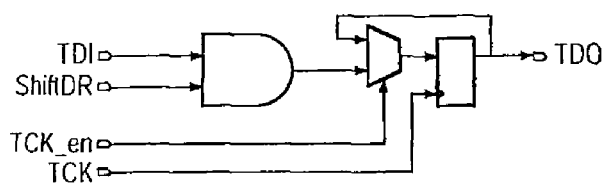
FIG. 21 is a schematic diagram showing a representative BR Cell in the shift register for the security interface of the invention.

The block diagram in FIG. 13 shows a generic architecture of Standard TAP and Boundary Scan. The TAP Controller state diagram is illustrated in FIG. 14. FIG. 15 lists the external signals.

FIG. 17 lists and describes the test shift registers. There are a total of five test shift registers in the TCM 310 (JTAG and BS_REG blocks). Depending on the command in the instruction register, one of the registers is placed between TDI and TDO in the JTAG interface 34.

The instructions register is chosen to be 4 bits long. The instructions are listed and described in FIG. 22. Some specifics about the implementation rules:
1) The reset state (Test-Logic-Reset) would default to the instruction IDCODE (IEEE Spec. 1149.1).
2) EXTEST and BYPASS are required by the IEEE Spec to be opcode all '0' s and all '1' s respectively, regardless of the instruction length.
3) Mandatory instructions are EXTEST, SAMPLE/PRELOAD, BYPASS and IDCODE. Recommended instructions are INTEST and RUNBIST.
4) Unused instruction opcode defaults to BYPASS instruction.

Data is typically loaded onto the latched parallel outputs of boundary-scan-shift-register stages using the SAMPLE/PRELOAD instruction prior to selection of the EXTEST instruction. The mandatory EXTEST instruction allows testing of off-chip circuitry and board level interconnections.

The selected scan chain is placed in test mode by the EXTEST instruction. The EXTEST instruction connects the boundary scan chain between TDI and TDO. When the instruction register is loaded with the EXTEST instruction, all the scan cells are placed in their test mode of operation. In the Capture-DR state, the boundary scan cells drive chip outputs with the data in the Boundary Scan Cells, and the Boundary Scan Cells capture the data on chip inputs.

In the Shift-DR state, the previously captured test data is shifted out of the scan chain via TDO, while new test data is shifted in via the TDI input. This data is applied during the update IR state, to the system logic and system pins. The data received at the system input pins is supplied without modification to the on-chip system logic; data from the on-chip system logic is driven without modification through the system output pins; etc. The mode input is held at '0' when the SAMPLE/PRELOAD instruction is selected.

SAMPLE allows a snapshot to be taken of the data flowing from the system pins to the on-chip system logic, or vice versa, without interfering with the normal operation of the assembled board. The snapshot is taken on the rising edge of TCK in the CaptureDR controller state, and the data can be viewed by shifting through the component's TDO output.

PRELOAD allows an initial data pattern to be placed at the latched parallel outputs of the boundary scan register cells prior to selection of another boundary-scan test operation.

Moving the TAP controller through the sequence Capture-DR→Exit1-DR→Update-DR while the SAMPLE/PRELOAD instruction is selected, the state of the signals flowing into and out of the on-chip system logic at the time of sampling can be loaded onto latched parallel output of the boundary-scan shift register.

The selected scan chain is placed in test mode by the INTEST instruction. The INTEST instruction connects the boundary scan chain between TDI and TDO. When the instruction register is loaded with the INTEST instruction, all the boundary scan cells are placed in their test mode of operation. In the Capture-DR state, the boundary scan cells apply data to the internal ASIC 200 inputs and capture the data from the internal outputs. In the Shift-DR state, the previously captured test data is shifted out of the scan chain via the TDO output, while new test data is shifted in via the TDI output. Single-step operation is possible using the INTEST instruction.

In the CFG_READ_REQUEST mode, the configuration register scan chain is connected between TDI and TDO. This instruction generates configuration register read requests to the MIC 304, and can also shift out the data from any previously requested read.

During the Capture-DR state, the value returned from any previous configuration register read request is captured in the data section (15:0) of the shift register, and the address section (30:16) is cleared. In the Shift-DR state, the captured read data is shifted out of the data section and a new address for reading is shifted into the address section. In the Update-DR state, the values loaded in the register during the Shift-DR stage are latched, and one full TCK cycle later, an enable pulse and the latched address are sent to the MIC 304 which performs a read to that address.

In the CFG_RETURN_READ_DATA mode, the configuration register scan chain is connected between TDI and TDO. This instruction captures data from any previously requested configuration register read. During the Capture-DR state, the value returned from any previous configuration register read request is captured in the data section (15:0) of the shift register, and the address section (30:16) is cleared. In the Shift-DR state, the captured read data is shifted out of the data section of the register. Unlike the CFG_READ_REQUEST instruction, the CFG_RETURN_READ_DATA command does not send an enable pulse to the MIC 304 after the Update-DR state. Although this instruction may seem redundant because it performs a subset of the functionality of the CFG_READ_REQUEST command, it is necessary to read MIC 304 data without requesting another read, and also for security reasons (see debug mode).

In the CFG_WRITE mode, the configuration register scan chain is connected between TDI and TDO. This instruction generates configuration register write requests to the MIC 304. During the Capture-DR state, the shift register is cleared. In the Shift-DR state, an address and the data to be written to that address are shifted in. In the Update-DR state, the values loaded in the register during the Shift-DR stage are latched, and one full TCK cycle later, an enable pulse and the latched address and data are sent to the MIC 304 which performs a write to the configuration register corresponding to that address.

The IDCODE instruction connects the device identification register (or ID register) between TDI and TDO. The ID register is a 32-bit register that allows the manufacturer, part number and version of a component to be determined through the TAP. When the instruction register is loaded with the IDCODE instruction, all the scan cells are placed in their normal (system) mode of operation. In the Capture-DR state, the device identification code is captured by the ID register. In the Shift-DR state, the previously captured device identification code is shifted out of the ID register via the TDO output. In the Update-DR state, the ID.14.2.3.8 BYPASS (1111)

The BYPASS instruction connects a 1 bit shift register (the BYPASS register) between TDI and TDO. When the BYPASS instruction is loaded into the instruction register, all the scan cells are placed in their normal (system) mode of operation. This instruction has no effect on the system pins. In the Capture-DR state, a logic '0' is captured by the bypass register. In the Shift-DR state, test data is shifted into the bypass register via the TDI input and out via the TDO output after a delay of one TCK cycle. The first bit shifted out will be a zero. The bypass register is not affected in the Update-DR state. All unused instruction codes default to the BYPASS instruction.

The ASIC Identification code is accessible through the instruction IDCODE. The 32-bit JTAG ID as defined in the table of FIG. 23 will be shifted out. The version number is as defined in the SM version control register.

To help protect the data in the device, there are 2 modes of operation for the TCM 310: Debug Mode (full normal operation) and Restricted Mode (limited functionality). The Debug Mode is entered whenever the SM is in either the Insecure Debug or Secure Debug states, described above. When the SM is in any other state, the TCM 310 will operate in restricted mode.

The Debug Mode is the normal operation of the TCM 310. In this mode all instructions are available, all the shift registers are fully connected between TDI and TDO, and CFG bus reads/writes are allowed on any address.

On the other hand, in restricted mode, there is no access to boundary scan register, and only four of the JTAG instructions are available, with limited functionality: IDCODE, CFG_READ_REQUEST, CFG_RETURN_READ_DATA, and CFG_WRITE. The IDCODE and CFG_RETURN_READ_DATA commands function as normal; however, the CFG_READ_REQUEST and CFG_WRITE commands are limited to the addresses they can access. The CFG_READ_REQUEST instruction will only send an enabling request pulse to the MIC 304 when the address latched in the update-DR state is the SM Status Register (0xEA02). The CFG_WRITE instruction will only send an enabling request pulse to the MIC 304 when the address latched in the update-DR state is one of the SM registers (0xEAXX).

When a series of chips are chained together the interface of the invention will be the first chip in the JTAG chain, so in order to prevent access to other chips in a design, there will be no direct connection between the interface TDI and TDO ports, and, while in restricted mode. More specifically, while in IDCODE and CFG_RETURN_READ_DATA modes, TDI will be held at '1'; and in CFG_READ_REQUEST and CFG_WRITE modes, TDO will be held at '1'.

Various embodiments of the present invention having been thus described in detail by way of example, it will be apparent to those skilled in the art that variations and modifications may be made without departing from the invention.

We claim:

1. A method of providing debugging access to a processing device comprising a first memory device and a second memory device, the method comprising:
   receiving a request for debugging access;
   if the processing device is in an insecure state,
      denying access to at least one encryption key stored on the processing device such that decryption of encrypted data stored on the first memory device is not permitted,
      overwriting unencrypted data in the second memory device, and
      providing access to a set of debugging functions; and
   if the processing device is in a secure state,
      permitting access to the at least one encryption key such that decryption of encrypted data stored on the first memory device is permitted, and
      providing access to the set of debugging functions.

2. The method of claim 1, further comprising:
   receiving a request to transition the processing device from the insecure state to the secure state, the request to transition the processing device comprising a password;
   comparing the received password to a password stored in a secure, non-volatile memory; and
   if the received password matches the stored password, transitioning the processing device from the insecure state to the secure state.

3. The method of claim 2, wherein at least one of the request for debugging access or the received password is received via a debugging port interface.

4. The method of claim 2, wherein at least one of the request for debugging access or the received password is received via a JTAG port interface.

5. The method of claim 1, further comprising:
   prior to receiving the request for debugging access, providing restricted debugging access, the restricted debugging access comprising access to some but not all functions of the set of debugging functions.

6. The method of claim 1, further comprising:
   upon receipt of a command to exit debugging access while access to the set of debugging functions is being provided,
      providing restricted debugging access, the restricted debugging access comprising access to some but not all functions of the set of debugging functions, and
      if the processing device is in the secure state, transitioning the processing device from the secure state to the insecure state.

7. The method of claim 1, wherein the first memory device comprises a non-volatile memory store, and wherein the second memory device comprises a volatile memory store.

8. A processing device comprising a processor, a first memory device, and a second memory device, the processor being configured to:
   receive a request for debugging access;
   determine if the processing device is in an insecure state or a secure state;
   if the processing device is determined to be in the insecure state when the request for debugging access is received,
      deny access to at least one encryption key stored on the processing device such that decryption of encrypted data stored on the first memory device is not permitted,
      overwrite unencrypted data in the second memory device, and
      provide access to a set of debugging functions; and
   if the processing device is determined to be in the secure state when the request for debugging access is received,
      permit access to the at least one encryption key such that decryption of encrypted data stored on the first memory device is permitted, and
      provide access to the set of debugging functions.

9. The processing device of claim 8, wherein the processor is further configured to:
   receive a request to transition the processing device from the insecure state to the secure state, the request to transition the processing device comprising a password;
   compare the received password to a password stored in a secure, non-volatile memory; and if the received password matches the stored password, transition the processing device from the insecure state to the secure state.

10. The processing device of claim 9, wherein at least one of the request for debugging access or the received password is received via a debugging port interface.

11. The processing device of claim 9, wherein at least one of the request for debugging access or the received password is received via a JTAG port interface.

12. The processing device of claim 8, wherein the processor is further configured to:
prior to receiving the request for debugging access, provide restricted debugging access, the restricted debugging access comprising access to some but not all functions of the set of debugging functions.

13. The processing device of claim 8, wherein the processor is further configured to:
receive a command to exit debugging access;
if the command to exit debugging access is received while access to the set of debugging functions is being provided,
provide restricted debugging access, the restricted debugging access comprising access to some but not all functions of the set of debugging functions, and
if the processing device is in the secure state when the command to exit debugging access is received, transition the processing device from the secure state to the insecure state.

14. The processing device of claim 8, wherein the first memory device comprises a non-volatile memory store, and wherein the second memory device comprises a volatile memory store.

15. A computer readable storage medium comprising instructions that, when executed by a processor of a processing device comprising a first memory device and a second memory device, cause the processing device to perform acts of a method of providing debugging access to the processing device, the acts comprising:
receiving a request for debugging access;
if the processing device is in an insecure state,
denying access to at least one encryption key stored on the processing device such that decryption of encrypted data stored on the first memory device is not permitted,
overwriting unencrypted data in the second memory device, and
providing access to a set of debugging functions; and
if the processing device is in a secure state,
permitting access to the at least one encryption key such that decryption of encrypted data stored on the first memory device is permitted, and
providing access to the set of debugging functions.

16. The medium of claim 15, wherein the acts further comprise:
receiving a request to transition the processing device from the insecure state to the secure state, the request to transition the processing device comprising a password;
comparing the received password to a password stored in a secure, non-volatile memory; and
if the received password matches the stored password, transitioning the processing device from the insecure state to the secure state.

17. The medium of claim 16, wherein at least one of the request for debugging access or the received password is received via a debugging port interface.

18. The medium of claim 16, wherein at least one of the request for debugging access or the received password is received via a JTAG port interface.

19. The medium of claim 15, wherein the acts further comprise:
prior to receiving the request for debugging access, providing restricted debugging access, the restricted debugging access comprising access to some but not all functions of the set of debugging functions.

20. The medium of claim 15, wherein the acts further comprise:
upon receipt of a command to exit debugging access while access to the set of debugging functions is being provided,
providing restricted debugging access, the restricted debugging access comprising access to some but not all functions of the set of debugging functions, and
if the processing device is in the secure state, transitioning the processing device from the secure state to the insecure state.

21. The medium of claim 15, wherein the first memory device comprises a non-volatile memory store, and wherein the second memory device comprises a volatile memory store.

* * * * *